United States Patent
Suzuki et al.

(10) Patent No.: US 11,575,862 B2
(45) Date of Patent: *Feb. 7, 2023

(54) IMAGE PROCESSING DEVICE AND IMAGE PROCESSING METHOD

(71) Applicant: SONY CORPORATION, Tokyo (JP)

(72) Inventors: Takaaki Suzuki, Tokyo (JP); Takahiro Nagano, Tokyo (JP); Noriaki Takahashi, Tokyo (JP); Haruka Mitsumori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 142 days.

This patent is subject to a terminal disclaimer.

(21) Appl. No.: 17/057,250

(22) PCT Filed: Mar. 8, 2019

(86) PCT No.: PCT/JP2019/009423
§ 371 (c)(1),
(2) Date: Nov. 20, 2020

(87) PCT Pub. No.: WO2019/230108
PCT Pub. Date: Dec. 5, 2019

(65) Prior Publication Data
US 2021/0195153 A1    Jun. 24, 2021

(30) Foreign Application Priority Data

May 28, 2018 (JP) .............................. JP2018-101545

(51) Int. Cl.
*H04N 9/31* (2006.01)
*G06T 5/00* (2006.01)
*G06T 5/20* (2006.01)

(52) U.S. Cl.
CPC .......... *H04N 9/3185* (2013.01); *G06T 5/003* (2013.01); *G06T 5/20* (2013.01)

(58) Field of Classification Search
CPC .... H04N 9/3185; H04N 9/3894; G06T 5/003; G06T 5/20
See application file for complete search history.

(56) References Cited

U.S. PATENT DOCUMENTS 8,837,853 B2 *  9/2014  Tachi ................. H04N 9/04555
                                               382/263
9,460,498 B2 * 10/2016  Matsumoto ............. G06T 5/008
(Continued)

FOREIGN PATENT DOCUMENTS

CN    101364033 A    2/2009
CN    107409192 A    11/2017
(Continued)

OTHER PUBLICATIONS

International Search Report and Written Opinion of PCT Application No. PCT/JP2019/009423, dated May 28, 2019, 11 pages of ISRWO.

*Primary Examiner* — Brian P Yenke
(74) *Attorney, Agent, or Firm* — Chip Law Group

(57) ABSTRACT

Correction performance is improved regarding a synthetic blur in which a plurality of blur characteristics is synthesized, for example, a focus blur that occurs in a superimposed projection image, or the like. An image processing device according to the present technology includes: a correction unit that obtains a plurality of blur-corrected images by performing blur correction processing on an input image regarding a focus blur that occurs in a projection image by an image projection device, by using a filter coefficient for blur correction corresponding to each of a plurality of blur characteristics, the filter each being obtained on the basis of the plurality of blur characteristics; and an image output unit that individually outputs the plurality of blur-corrected images obtained by the correction unit.

11 Claims, 14 Drawing Sheets

(56) References Cited

U.S. PATENT DOCUMENTS

| | | | |
|---|---|---|---|
| 9,712,755 B2* | 7/2017 | Nishiyama | G06T 5/50 |
| 9,955,131 B2* | 4/2018 | Fukuda | H04N 9/3185 |
| 10,791,305 B2* | 9/2020 | Suzuki | H04N 9/3194 |
| 11,069,038 B2* | 7/2021 | Suzuki | H04N 9/3179 |
| 11,151,698 B2* | 10/2021 | Suzuki | H04N 9/3185 |
| 11,394,941 B2* | 7/2022 | Suzuki | G06T 5/20 |
| 2009/0040398 A1 | 2/2009 | Kasahara | |
| 2010/0195003 A1 | 8/2010 | Saigo | |
| 2013/0057734 A1* | 3/2013 | Tachi | H04N 9/04557 348/E9.037 |
| 2016/0295183 A1 | 10/2016 | Yamaguchi et al. | |
| 2018/0082406 A1 | 3/2018 | Suzuki et al. | |
| 2018/0247601 A1 | 8/2018 | Chen et al. | |
| 2020/0413015 A1* | 12/2020 | Asai | H04N 9/3194 |
| 2021/0368149 A1* | 11/2021 | Suzuki | H04N 9/3147 |

FOREIGN PATENT DOCUMENTS

| | | |
|---|---|---|
| EP | 2026587 A2 | 2/2009 |
| JP | 2006-174184 A | 6/2006 |
| JP | 2009-008974 A | 1/2009 |
| JP | 2009-042838 A | 2/2009 |
| JP | 2010-183229 A | 8/2010 |
| JP | 2016-197145 A | 11/2016 |
| WO | 2016/157670 A1 | 10/2016 |
| WO | 2016/157671 A1 | 10/2016 |

\* cited by examiner

FIG. 8

| | | | BLUR CHARACTERISTIC | FILTER COEFFICIENT |
|---|---|---|---|---|
| FIRST INSTALLATION CONDITION | FIRST PROJECTOR | REPRESENTATIVE POINT 1 | CHARACTERISTIC 3 | w5 |
| | | REPRESENTATIVE POINT 2 | CHARACTERISTIC 8 | w8 |
| | | ⋮ | ⋮ | ⋮ |
| | | REPRESENTATIVE POINT o | CHARACTERISTIC p | w15 |
| | SECOND PROJECTOR | REPRESENTATIVE POINT 1 | CHARACTERISTIC 5 | w10 |
| | | REPRESENTATIVE POINT 2 | CHARACTERISTIC 6 | w13 |
| | | ⋮ | ⋮ | ⋮ |
| | | REPRESENTATIVE POINT o | CHARACTERISTIC 10 | wr |
| | ⋮ | ⋮ | ⋮ | ⋮ |
| | n-TH PROJECTOR | REPRESENTATIVE POINT 1 | CHARACTERISTIC 1 | w8 |
| | | REPRESENTATIVE POINT 2 | CHARACTERISTIC 8 | w12 |
| | | ⋮ | ⋮ | ⋮ |
| | | REPRESENTATIVE POINT o | CHARACTERISTIC 12 | w9 |
| SECOND INSTALLATION CONDITION | FIRST PROJECTOR | REPRESENTATIVE POINT 1 | CHARACTERISTIC 4 | w4 |
| | | REPRESENTATIVE POINT 2 | CHARACTERISTIC 10 | w1 |
| | | ⋮ | ⋮ | ⋮ |
| | | REPRESENTATIVE POINT o | CHARACTERISTIC 7 | w7 |
| | SECOND PROJECTOR | REPRESENTATIVE POINT 1 | CHARACTERISTIC 6 | wr |
| | | REPRESENTATIVE POINT 2 | CHARACTERISTIC 8 | w14 |
| | | ⋮ | ⋮ | ⋮ |
| | | REPRESENTATIVE POINT o | CHARACTERISTIC 15 | w8 |
| | ⋮ | ⋮ | ⋮ | ⋮ |
| | n-TH PROJECTOR | REPRESENTATIVE POINT 1 | CHARACTERISTIC 2 | wr |
| | | REPRESENTATIVE POINT 2 | CHARACTERISTIC 6 | w2 |
| | | ⋮ | ⋮ | ⋮ |
| | | REPRESENTATIVE POINT o | CHARACTERISTIC p | w6 |
| ⋮ | ⋮ | ⋮ | ⋮ | ⋮ |
| m-TH INSTALLATION CONDITION | FIRST PROJECTOR | REPRESENTATIVE POINT 1 | CHARACTERISTIC 8 | w6 |
| | | REPRESENTATIVE POINT 2 | CHARACTERISTIC 12 | w12 |
| | | ⋮ | ⋮ | ⋮ |
| | | REPRESENTATIVE POINT o | CHARACTERISTIC 1 | w2 |
| | SECOND PROJECTOR | REPRESENTATIVE POINT 1 | CHARACTERISTIC 18 | wr |
| | | REPRESENTATIVE POINT 2 | CHARACTERISTIC 13 | w10 |
| | | ⋮ | ⋮ | ⋮ |
| | | REPRESENTATIVE POINT o | CHARACTERISTIC 1 | w5 |
| | ⋮ | ⋮ | ⋮ | ⋮ |
| | n-TH PROJECTOR | REPRESENTATIVE POINT 1 | CHARACTERISTIC 1 | w11 |
| | | REPRESENTATIVE POINT 2 | CHARACTERISTIC 5 | w12 |
| | | ⋮ | ⋮ | ⋮ |
| | | REPRESENTATIVE POINT o | CHARACTERISTIC 10 | w2 |

IMAGE PROCESSING DEVICE AND IMAGE PROCESSING METHOD

CROSS REFERENCE TO RELATED APPLICATIONS

This application is a U.S. National Phase of International Patent Application No. PCT/JP2019/009423 filed on Mar. 8, 2019, which claims priority benefit of Japanese Patent Application No. JP 2018-101545 filed in the Japan Patent Office on May 28, 2018. Each of the above-referenced applications is hereby incorporated herein by reference in its entirety.

TECHNICAL FIELD

The present technology relates to an image processing device and a method thereof, and particularly to a technical field of correcting a focus blur that occurs in a projection image.

BACKGROUND ART

An image projection device that projects and displays an image on a projection target such as a screen is widely known, for example, a liquid crystal projector device. As image projection using such an image projection device, for example, for the purpose of gaining luminance, projection is performed such that a plurality of image projection devices superimposes a target image on the projection target (so-called superimposed projection).

In a case where the superimposed projection is performed, it is difficult to arrange all the image projection devices at appropriate positions with respect to the projection target for convenience of installation. For that reason, an image blur (focus blur) due to focus deviation is likely to occur in a projection image by an image projection device arranged in an inappropriate position at least, and image quality degradation of a superimposed projection image is caused.

In Patent Document 1 below, a feedback type image correction technology is disclosed that sequentially changes a pixel value of an image projected by each image projection device so that a difference decreases between a pixel value of a pixel of a superimposed projection image and a pixel value of a pixel of an input image corresponding to the pixel of the superimposed projection image. By using the correction technology, it becomes possible to correct the focus blur that occurs in the superimposed projection image.

CITATION LIST

Patent Document

Patent Document 1: Japanese Patent Application Laid-Open No. 2009-8974

SUMMARY OF THE INVENTION

Problems to be Solved by the Invention

However, since the technology of Patent Document 1 described above performs feedback type correction, it takes time for a result to converge. In a case where many image processing devices are used to gain luminance in particular, there is a possibility that the result does not converge.

As a method of correcting the focus blur that occurs in the superimposed projection image, it is conceivable that a blur at each location of the superimposed projection image is measured by using an imaging device or the like, and correction processing (correction by signal processing) is performed on an image to be projected in advance by using a filter designed on the basis of an inverse function of the measured blur.

However, there is a limit to the size of the blur that can be eliminated by a current technology as a correction technology using the filter based on such an inverse function of the blur.

The present technology has been made in view of the circumstances described above, and an object of the present technology is to improve correction performance regarding a synthetic blur in which a plurality of blur characteristics is synthesized, for example, the focus blur that occurs in the superimposed projection image, and the like.

Solutions to Problems

An image processing device according to the present technology includes: a correction unit that obtains a plurality of blur-corrected images by performing blur correction processing on an input image regarding a focus blur that occurs in a projection image by an image projection device, by using a filter coefficient for blur correction corresponding to each of a plurality of blur characteristics, the filter each being obtained on the basis of the plurality of blur characteristics; and an image output unit that individually outputs the plurality of blur-corrected images obtained by the correction unit.

By obtaining each filter coefficient for the blur correction on the basis of the plurality of blur characteristics as described above, the correction filter coefficient for each of the blur characteristics can converge not only to have a tendency that the blur itself is canceled out (that is, a tendency that an enhancement in a direction in which the blur is large is increased) as before, but also to have a tendency that the enhancement in the direction in which the blur is large is decreased and an enhancement in a direction in which the blur is small is increased.

In the image processing device according to the present technology described above, it is desirable that the filter coefficient is obtained by a derivation formula in which the plurality of blur characteristics is collectively incorporated in one set.

By solving the derivation formula in which the plurality of blur characteristics is incorporated as described above, the correction filter coefficient for each of the blur characteristics can converge not only to have a tendency that the blur itself is canceled out (that is, a tendency that an enhancement in a direction in which the blur is large is increased) as before, but also to have a tendency that the enhancement in the direction in which the blur is large is decreased and an enhancement in a direction in which the blur is small is increased.

In the image processing device according to the present technology described above, it is desirable that the derivation formula includes a formula for obtaining, for each of the blur characteristics, a difference between a sum total of values obtained by performing blur addition processing based on the blur characteristics and the blur correction processing based on the filter coefficient on a pixel value of a target image, and a predetermined ideal value.

The derivation formula including the formula is a derivation formula from which the filter coefficient for the blur correction corresponding to each of the plurality of blur characteristics is derived and in which the plurality of blur characteristics is collectively incorporated in one set.

In the image processing device according to the present technology described above, it is desirable that the correction unit acquires combination information representing a combination of the blur characteristics, and acquires the filter coefficient corresponding to the combination of the blur characteristics represented by the combination information acquired, on the basis of a table in which the filter coefficient for each of the blur characteristics is stored for each combination of the blur characteristics.

As a result, it becomes unnecessary to obtain the filter coefficient by using the derivation formula when acquiring the filter coefficient corresponding to the combination of the blur characteristics when correcting the synthetic blur in which the plurality of blur characteristics is synthesized.

In the image processing device according to the present technology described above, it is desirable that the correction unit includes a coefficient derivation unit that derives the filter coefficient for each of the blur characteristics.

As a result, it is enabled to acquire an appropriate filter coefficient corresponding to the characteristic of the blur that occurs in an actual use environment and use the filter coefficient for the blur correction.

In the image processing device according to the present technology described above, it is desirable that the correction unit acquires combination information of the blur characteristics on the basis of a captured image by an imaging device.

As a result, it is enabled to acquire an appropriate filter coefficient corresponding to the synthetic blur that occurs in the actual use environment.

In the image processing device according to the present technology described above, it is desirable that the correction unit acquires combination information of the blur characteristics on the basis of an operation input.

As a result, it becomes unnecessary to perform blur measurement using the imaging device when acquiring the filter coefficient for each of the blur characteristics.

In the image processing device according to the present technology described above, it is desirable that the filter coefficient for each of the blur characteristics is a filter coefficient for each image projection device, and the image output unit distributes and outputs the plurality of blur-corrected images to a plurality of the image projection devices.

As a result, it is enabled to appropriately correct the synthetic blur that occurs in a case where the superimposed projection is performed by a plurality of the image projection devices.

In the image processing device according to the present technology described above, it is desirable that the filter coefficient for each of the blur characteristics is a filter coefficient for each of images of respective colors in a color image projection device, and the image output unit distributes and outputs the plurality of blur-corrected images to spatial light modulators of the respective colors in the color image projection device.

As a result, it is enabled to appropriately perform the blur correction corresponding to a case where the blur characteristics are different from each other between the projection images of respective colors such as red (R), green (G), and blue (B).

In the image processing device according to the present technology described above, it is desirable that the correction unit acquires combination information of the blur characteristics on the basis of a captured image by an imaging device, and in a case where there are more types of actually measured blur characteristics than types of the blur characteristics included in the table regarding the actually measured blur characteristic that is the blur characteristic measured on the basis of the captured image, reduces the types of the actually measured blur characteristics by unifying the blur characteristics that are in an approximation relationship among the actually measured blur characteristics.

As a result, it is enabled to appropriately acquire the filter coefficient for the blur correction in the case where there are more types of the actually measured blur characteristics than the types of the blur characteristics included in the table.

Furthermore, an image processing method according to the present technology includes: a correction step of obtaining a plurality of blur-corrected images by performing blur correction processing on an input image regarding a focus blur that occurs in a projection image by an image projection device, by using a filter coefficient for blur correction corresponding to each of a plurality of blur characteristics, the filter each being obtained on the basis of the plurality of blur characteristics; and an image output step of individually outputting the plurality of blur-corrected images obtained by the correction step.

With such an image processing method, a function similar to that of the image processing device according to the present technology described above can also be obtained.

Effects of the Invention

According to the present technology, it is possible to improve blur correction performance for the synthetic blur in which the plurality of blur characteristics is synthesized.

Note that, the effect described here is not necessarily limited, and can be any effect described in the present disclosure.

BRIEF DESCRIPTION OF DRAWINGS

FIG. 8 is a diagram illustrating an example of storage information of the LUT.

MODE FOR CARRYING OUT THE INVENTION

Hereinafter, embodiments according to the present technology will be described in the following order with reference to the accompanying drawings.

<1. First Embodiment>
[1-1. Overview of image projection system]
[1-2. Schematic configuration of image processing device]
[1-3. Synthetic blur correction method as embodiment]
[1-4. Image processing device as first embodiment]
[1-5. Processing procedure]
<2. Second Embodiment>
[2-1. Image processing device as second embodiment]
[2-2. Processing procedure]
<3. Third Embodiment>
<4. Modifications>
<5. Summary of embodiments>
<6. Present technology>

1. First Embodiment

[1-1. Overview of Image Projection System]

Figure 1:
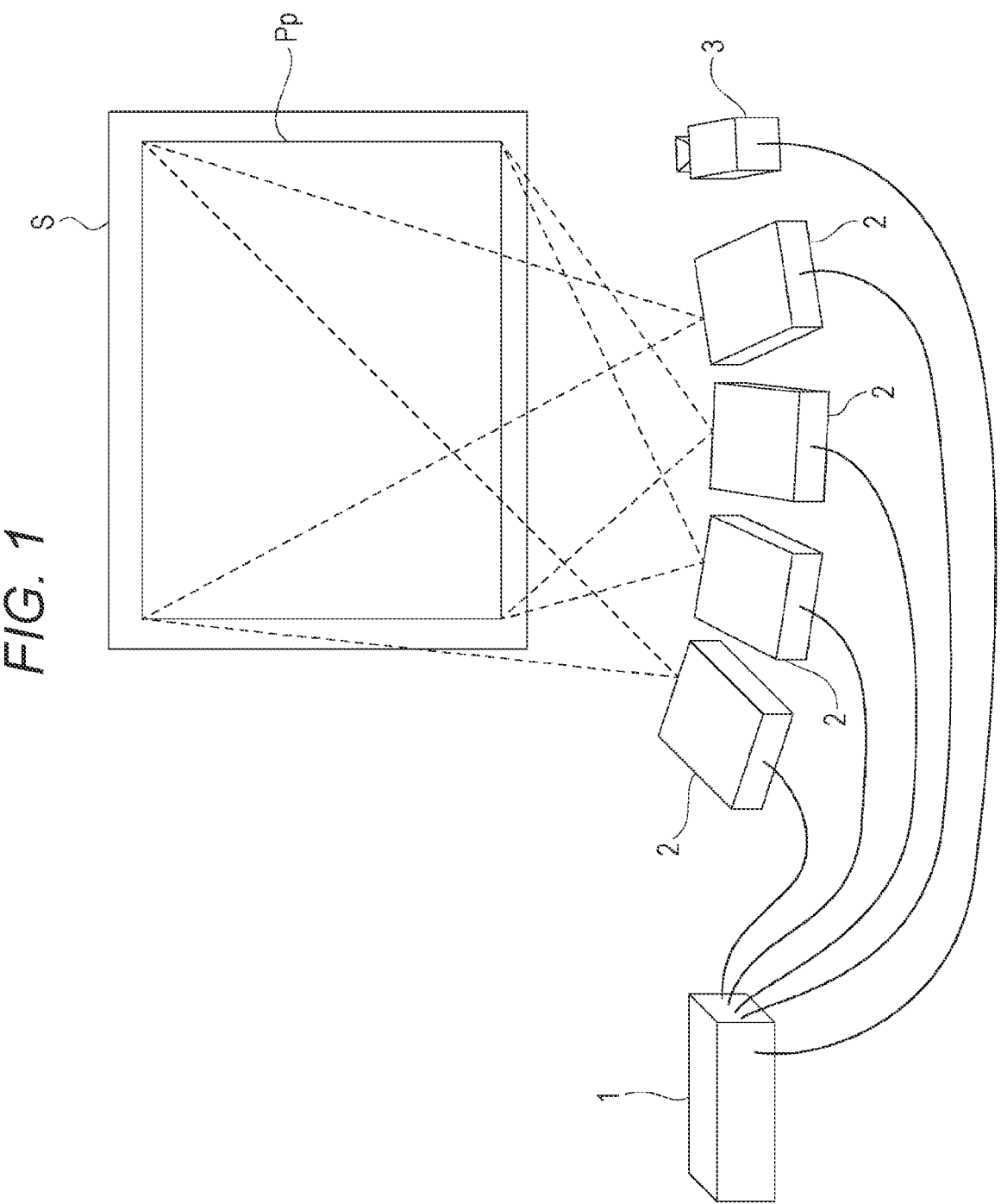
FIG. 1 is a diagram illustrating a configuration example of an image projection system including an image processing device as an embodiment.

FIG. 1 illustrates a configuration example of an image projection system (image projection system as an embodiment) including an image processing device 1 as an embodiment according to the present technology.

The image projection system as the embodiment includes an image processing device 1, n projector devices 2 (n is a natural number of greater than or equal to 2), and an imaging device 3.

Each projector device 2 is configured as a transmissive liquid crystal projector device. Specifically, the projector device 2 is configured as a so-called three-chip liquid crystal projector device including liquid crystal panels corresponding to red (R) color, green (G) color, and blue (B) color, respectively. As illustrated in the figure, in the image projection system of the present example, it is assumed that the number of projector devices 2 is four (n=4).

The image processing device 1 includes a computer device, for example, a Central Processing Unit (CPU), a Digital Signal Processor (DSP), or the like, and is enabled to perform various signal processing (image processing) on an image of digital data, and distribute and output the image to each projector device 2.

In the image projection system of the present embodiment, each projector device 2 projects the image distributed and output by the image processing device 1 onto a common screen S. At this time, projection of the image is performed so that projection images of respective projector devices 2 overlap each other on the screen S (so-called "superimposed projection"). Specifically, in the present embodiment, to improve luminance of the image displayed on the screen S, the superimposed projection is performed so that pixel positions of the projection images by the respective projector devices 2 coincide with each other.

Note that, a projection target of the image by the projector device 2 is not limited to the screen S, and can be a projection target other than the screen S, for example, a wall surface in a room, or the like.

Here, hereinafter, the image displayed on the projection target by the superimposed projection is referred to as a "superimposed projection image Pp".

The imaging device 3 is configured as a digital camera device including an imaging element, for example, a Charged-coupled devices (CCD) sensor, a Complementary metal-oxide-semiconductor (CMOS) sensor, or the like. The imaging device 3 is enabled to communicate with the image processing device 1 and transmit a captured image to the image processing device 1. In the present example, the imaging device 3 is used to obtain a captured image when the image processing device 1 measures a focus blur that occurs in the projection image by the projector device 2, and is arranged at a position at which an entire projection range of the image on the screen S falls within an angle of view.

[1-2. Schematic Configuration of Image Processing Device]

Figure 2:
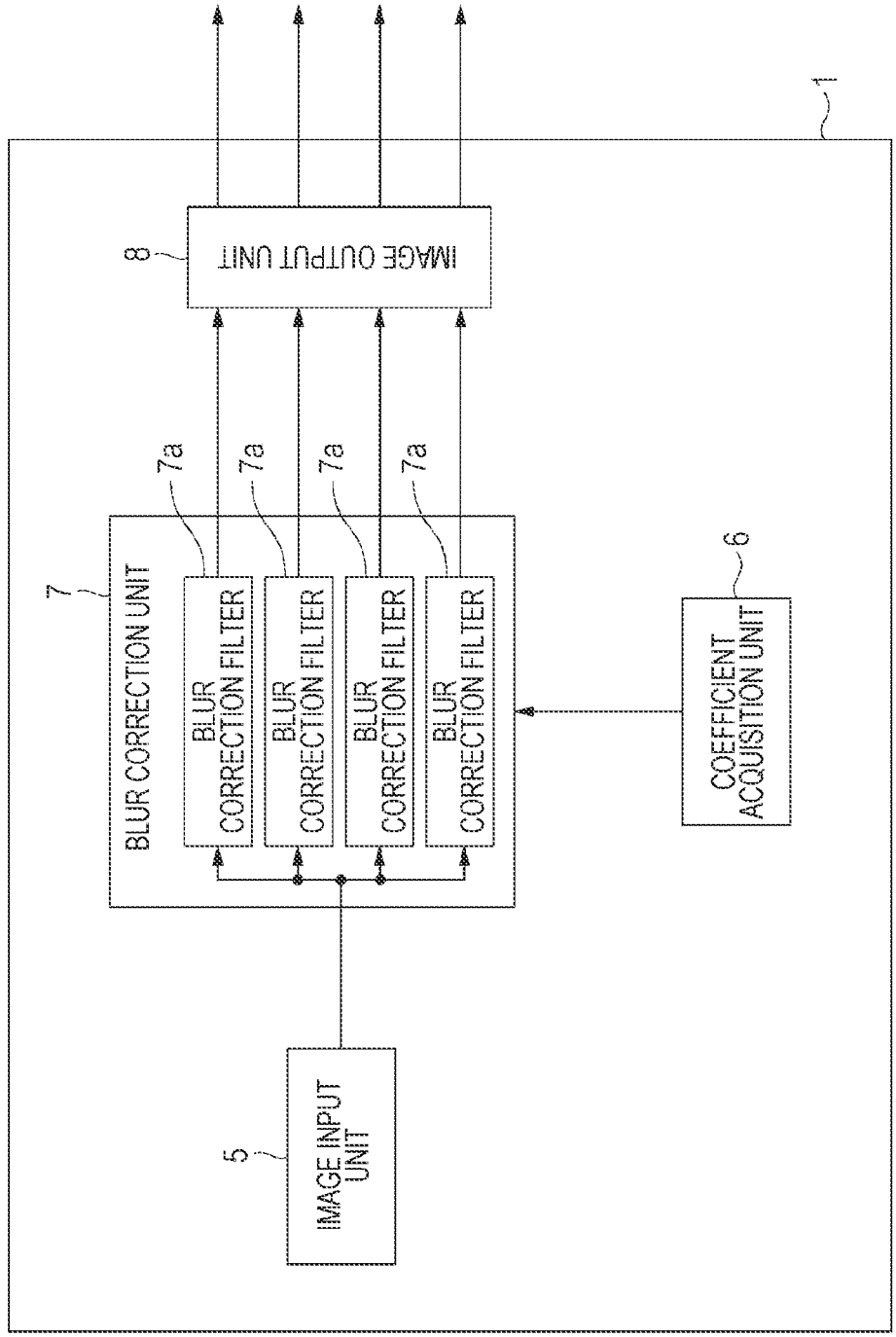
FIG. 2 is a block diagram illustrating a schematic configuration of an image processing device as an embodiment.

FIG. 2 is a block diagram illustrating a schematic configuration of the image processing device 1.

The image processing device 1 performs signal processing (filter processing) for blur correction on an image to be projected to correct a synthetic blur that occurs in the superimposed projection image Pp, that is, a blur in which blurs that occur in the projection images of the respective projector devices 2 are synthesized, and causes each projector device 2 to project the image subjected to the signal processing.

As illustrated in the figure, the image processing device 1 includes an image input unit 5, a coefficient acquisition unit 6, a blur correction unit 7, and an image output unit 8.

The image input unit 5 inputs an image projected by the projector device 2 (that is, an image to be projected). Input of the image may be performed from, for example, an external device of the image processing device 1, or a configuration can be made in which image data stored in a storage device, for example, a Hard Disk Drive (HDD), a Solid State Drive (SSD), or the like provided in the image processing device 1 is read and input The coefficient acquisition unit 6 acquires a filter coefficient for each of blur characteristics obtained by a predetermined derivation formula. The derivation formula is a derivation formula from which the filter coefficient for blur correction corresponding to each of the plurality of blur characteristics is derived for the focus blur that occurs in the projection image, and is a formula in which the plurality of blur characteristics is collectively incorporated in one set.

When the synthetic blur is corrected that occurs in the superimposed projection image Pp by the plurality of projector devices 2 as in the present example, the filter coefficient for each projector device 2 is acquired as the filter coefficient. At this time, since the characteristic of the blur in the superimposed projection image Pp may be different for each pixel, a filter coefficient corresponding to each of positions (each of representative points described later in the present example) of the superimposed projection image Pp is acquired as the filter coefficient of each projector device 2.

Note that, details will be described again of a blur correction method as the embodiment, including the derivation formula described above.

The blur correction unit 7 performs blur correction processing on the image input by the image input unit 5 on the basis of individual filter coefficients acquired by the coefficient acquisition unit 6 to obtain a plurality of blur-corrected images. Specifically, the blur correction unit 7 in the present example includes the same number of blur correction filters 7a as the projector devices 2, and the blur correction filters 7a each perform the blur correction processing on the input image by using the filter coefficient acquired for the corresponding projector device 2. As a result, the blur-corrected image for each projector device 2 is obtained.

The blur correction processing here is signal processing using a filter designed by an inverse function of a blur.

The image output unit 8 individually outputs a plurality of the blur-corrected images obtained by the blur correction unit 7. Specifically, the image output unit 8 of the present example outputs a corresponding one of the blur-corrected images for each projector device 2.

The projector devices 2 respectively project the corresponding blur-corrected images, whereby a focus blur in the superimposed projection image Pp can be eliminated.

Here, a "correction unit" according to the present technology is a portion including at least the coefficient acquisition unit 6 and the blur correction unit 7 in the present example.

[1-3. Synthetic Blur Correction Method as Embodiment]

First, the synthetic blur will be described with reference to FIGS. 3A, 3B and 3C.

Figure 3A:
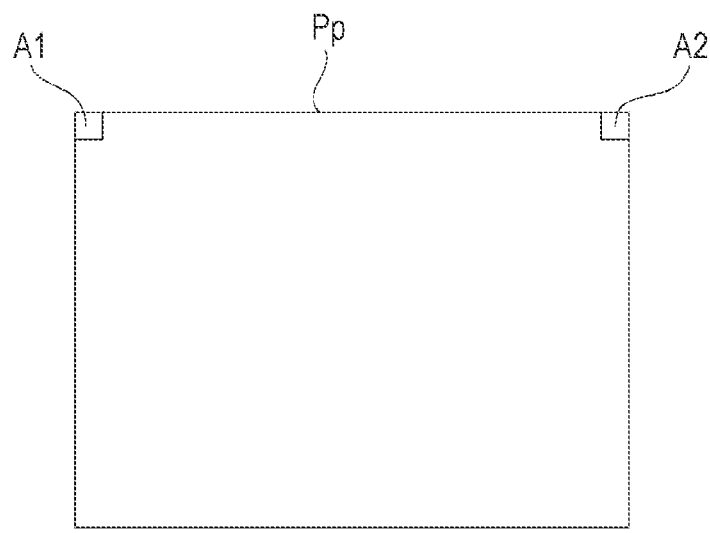
FIGS. 3A, 3B, and 3C are explanatory diagrams of a synthetic blur.

FIG. 3A illustrates two different image areas —A1 and A2 in the superimposed projection image Pp. The horizontal and vertical directions of the paper surface correspond to the horizontal and vertical directions of the image, respectively, and it is assumed that the image area A1 is an area on the upper left corner of the superimposed projection image Pp, and the image area A2 is an area on the upper right corner of the superimposed projection image Pp.

Figure 3B:
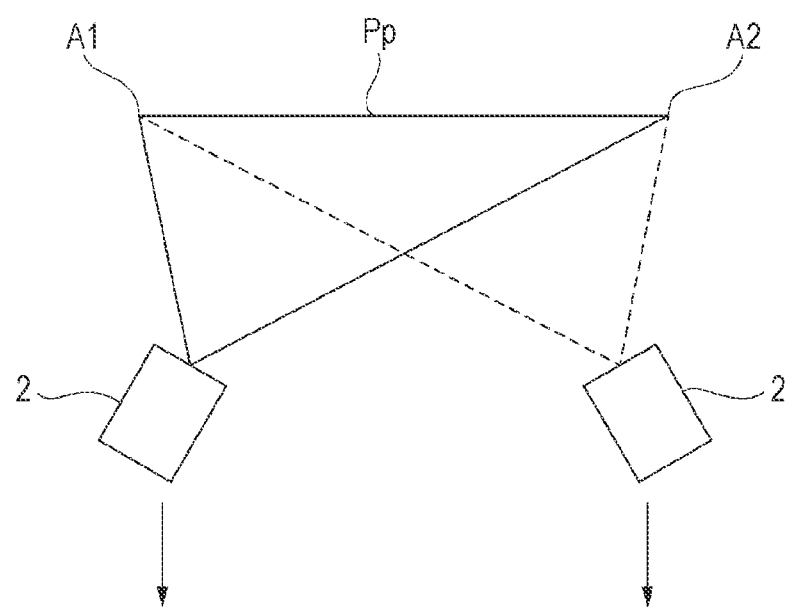

As illustrated in FIG. 3B, for the sake of explanation, a case is considered where the superimposed projection image Pp is obtained by image projection of the two projector devices 2.

Since the two projector devices 2 cannot be arranged at the same position during the superimposed projection, the focus blurs respectively having different characteristics occur in the projection images by the respective projector devices 2 mainly due to a difference in the optical path length to the projection plane, and the like.

At this time, the focus blur that occurs in the superimposed projection image Pp is due to the focus blur that occurs in the projection image of each projector device 2; however, in the projection image of the projector device 2 alone, the characteristic of the focus blur may be different for each pixel (each area in the image). This is due to the fact that the difference occurs in the optical path length to each area in the image.

Here, for example, in a case where the two projector devices 2 are arranged apart from each other on the left and right as illustrated in FIG. 3B, a characteristic of a focus blur that occurs in the image area A1 in the projection image of the projector device 2 on the left side is set as a blur characteristic C1L. Furthermore, a characteristic of the focus blur that occurs in the image area A2 in the projection image of the projector device 2 on the left side is set as a blur characteristic C2L. Moreover, characteristics of focus blurs that occur in the image areas A1 and A2 in the projection image of the projector device 2 on the right side are set as blur characteristics C1R and C2R, respectively.

Figure 3C:
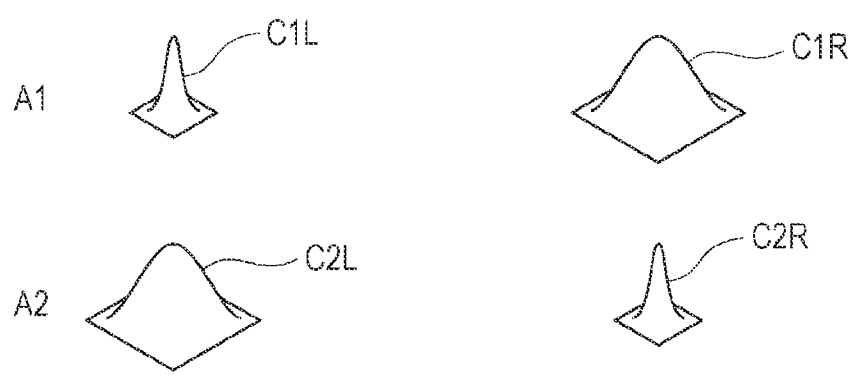

FIG. 3C schematically illustrates an example of these blur characteristics C1L, C2L, C1R, and C2R. Here, as a visualization model of each blur characteristic C, a visualization model of a Point Spread Function (PSF) is illustrated.

As illustrated in the figure, regarding the blur characteristics C1L and C2L due to the projector device 2 on the left side, the blur characteristic C1L has a tendency that the blur in the horizontal direction of the image is small and the blur in the vertical direction is large, whereas, conversely, the blur characteristic C2L has a tendency that the blur in the vertical direction is small and the blur in the horizontal direction is large.

Furthermore, regarding the blur characteristics C1R and C2R due to the projector device 2 on the right side, the blur characteristic C1R has a tendency that the blur in the vertical direction is small and the blur in the horizontal direction is large, and the blur characteristic C2R has a tendency that the blur in the vertical direction is large and the blur in the horizontal direction of the image is small.

Focusing on the image area A1, the blur characteristic C1L of the projector device 2 on the left side has a tendency that the blur in the horizontal direction is small since the optical path length in the horizontal direction from the projector device 2 to the image area A1 is relatively short. On the other hand, the blur characteristic C1R of the projector device 2 on the right side has a tendency that the blur in the horizontal direction is large since the optical path length in the horizontal direction from the projector device 2 to the image area A1 is relatively long. For a similar reason, focusing on the image area A2, the blur characteristic C2L of the projector device 2 on the left side has a tendency that the blur in the horizontal direction is large, and, conversely, the blur characteristic C2R of the projector device 2 on the right side has a tendency that the blur in the horizontal direction is small.

As described above, in the case where the superimposed projection is performed, the blur characteristic of each projector device 2 may be different for each area in the image.

Here, as a method for correcting the blur that occurs in the superimposed projection image Pp, there is a method as a preceding example as described below.

Figure 4:
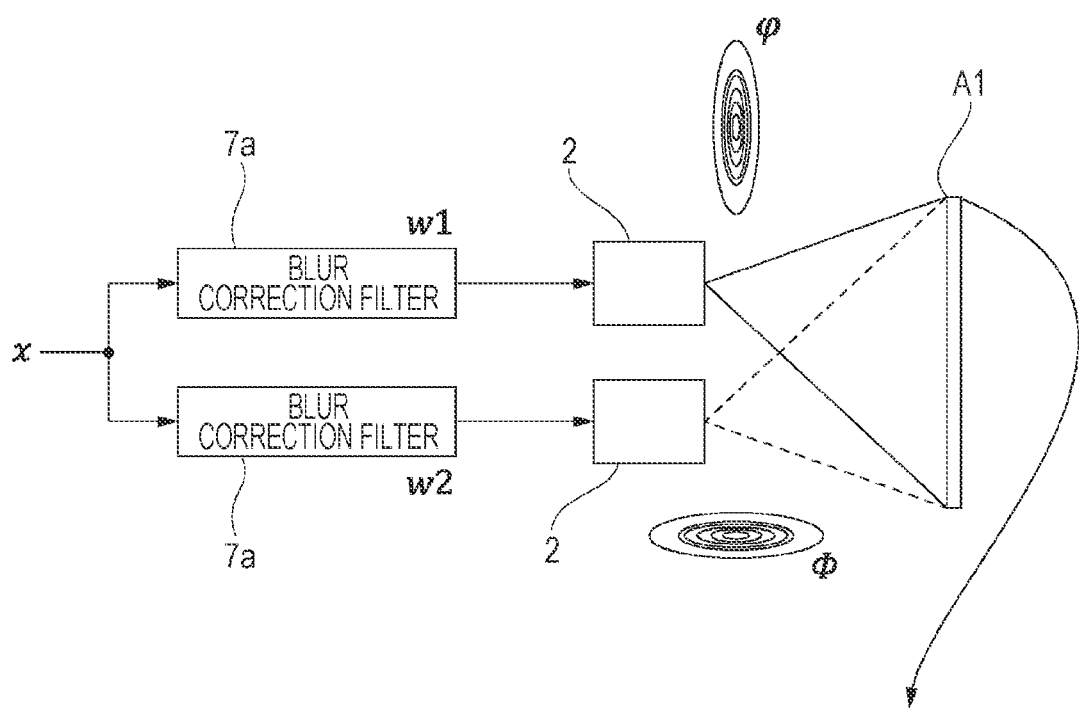
FIG. 4 is an explanatory diagram of a blur correction method as a preceding example.

FIG. 4 is an explanatory diagram of a blur correction method as a preceding example.

Note that, also here, for convenience of explanation, it is assumed that the superimposed projection is performed by the two projector devices 2. Furthermore, here, the blur correction processing for a single area in the image is considered. By performing the blur correction on each area in the image by a method similar to a method described below, it is possible to implement the blur correction of the entire superimposed projection image Pp.

The blur correction method as the preceding example uses a filter designed by an inverse function of a blur when correcting the blur. That is, the blur correction filter 7a described above is used. In the figure, the two blur correction filters 7a are provided corresponding to a case where the superimposed projection is performed by the two projector devices 2.

Here, a characteristic of a blur that occurs in a projection image (here, a single area in the image) of one projector device 2 is set as a blur characteristic $\varphi$, and a characteristic of a blur that occurs in a projection image (similarly, a single area in the image) of the other projector device 2 is set as a blur characteristic $\Phi$.

Furthermore, a filter coefficient for correcting the blur due to the blur characteristic $\varphi$ is w1, and a filter coefficient for correcting the blur due to the blur characteristic $\Phi$ is w2.

The filter processing for the blur correction here is processing of emphasizing (enhancing) an edge, and is performed by using a plurality of filter coefficients in one set, for example, a 5×5 filter, or the like. That is, the filter coefficients w1 and w2 described above include a plurality of filter coefficients.

A pixel value of an image obtained by performing the filter processing for the blur correction by the blur correction filter 7a on the input image and projecting the image by the projector device 2 can be expressed by [Formula 1] or [Formula 2] below for each projector device 2.

[Expression 1]

$$\sum_j \varphi_j \left( \sum_i w1_i x_i \right) \quad \text{[Formula 1]}$$

[Expression 2]

$$\sum_j \Phi_j \left( \sum_i w2_i x_i \right) \quad \text{[Formula 2]}$$

That is, a value of the projection image of the one projector device 2 in this case can be expressed as a value obtained by performing blur addition processing based on the blur characteristic φ and blur correction processing based on the filter coefficient w1 on a pixel value x of the input image, as in [Formula 1]. Furthermore, a value of the projection image of the other projector device 2 in this case can be expressed as a value obtained by performing blur addition processing based on the blur characteristic Φ and blur correction processing based on the filter coefficient w2 on the pixel value x, as in [Formula 2].

In the preceding example, the filter coefficients w1 and w2 for the blur correction are obtained on the basis of derivation formulas indicated in [Formula 3] and [Formula 4] below.

[Expression 3]

$$Q1 = \frac{1}{2} y - \sum_j \varphi_j \left( \sum_i w1_i x_i \right) \quad \text{[Formula 3]}$$

[Expression 4]

$$Q2 = \frac{1}{2} y - \sum_j \Phi_j \left( \sum_i w2_i x_i \right) \quad \text{[Formula 4]}$$

Here, in [Formula 3] and [Formula 4], "y" is an ideal value of a pixel value of the superimposed projection image Pp, and specifically, represents a pixel value of the superimposed projection image Pp in an ideal state where a focus blur does not occur.

In the preceding example, the filter coefficient w1 corresponding to the one projector devices 2 is obtained on the basis of Q1 represented by [Formula 3], that is, a value of an error between the value obtained by performing the blur addition processing based on the blur characteristic φ and the blur correction processing based on the filter coefficient w1 on the pixel value x, and a predetermined ideal value (here, y/2). Specifically, the filter coefficient w1 is obtained that makes the error Q1 as small as possible.

Furthermore, in the preceding example, the filter coefficient w2 corresponding to the other projector device 2 is obtained on the basis of Q2 represented by [Formula 4], that is, a value of an error between the value obtained by performing the blur addition processing based on the blur characteristic Φ and the blur correction processing based on the filter coefficient w2 on the pixel value x, and a predetermined ideal value (y/2). Specifically, the filter coefficient w2 is obtained that makes the error Q2 as small as possible.

However, according to the method of the preceding example described above, since the filter coefficient w for each projector device 2 is individually obtained to cancel out the blur (φ or Φ) due to a single characteristic, there is a possibility that the blur cannot be completely corrected in a case where the blur that occurs is large.

For example, it is assumed that the blur characteristic φ has a characteristic that the blur in the vertical direction is large and the blur in the horizontal direction is small like the blur characteristic C1L described above, and the blur characteristic Φ has a characteristic that the blur in the horizontal direction is large and the blur in the vertical direction is small like the blur characteristic C1R.

In this case, in a case where the filter coefficient w1 that eliminates the blur due to φ is obtained as in [Formula 3], the filter coefficient w1 is obtained that increases an enhancement in the vertical direction in which the blur is large. Furthermore, in a case where the filter coefficient w2 that eliminates the blur due to Φ is obtained as in [Formula 4], the filter coefficient w2 is obtained that increases an enhancement in the horizontal direction in which the blur is large.

At this time, the filter coefficient w has a tendency that a coefficient with a larger absolute value is derived to cancel out a larger blur, but in a case where a blur to be canceled out is large and a coefficient with a large absolute value is obtained, there is a possibility that a pixel value after the blur correction exceeds a dynamic range, and an effect of the correction cannot be reflected in the projection image.

Thus, in the method of the preceding example having a tendency that the enhancement in the direction in which the blur is large is increased as described above, there is a limit to the size of a blur that can be eliminated.

Thus, in the present embodiment, the filter coefficients w1 and w2 are obtained on the basis of a derivation formula in which a plurality of blur characteristics is collectively incorporated in one set, as in [Formula 5] below.

[Expression 5]

$$Q = y - \sum_j \varphi_j \left( \sum_i w1_i x_i \right) - \sum_j \Phi_j \left( \sum_i w2_i x_i \right) \quad \text{[Formula 5]}$$

Specifically, the filter coefficients w1 and w2 are obtained that make an error Q in [Formula 5] as small as possible.

It can be said that the error Q is a difference between a sum total of the values obtained by performing the blur addition processing based on the blur characteristic and the blur correction processing based on the filter coefficient (w1, w2) on the pixel value x for each blur characteristic (φ, Φ), and a predetermined ideal value (y).

In short, it can be said that [Formula 5] obtains the filter coefficients w1 and w2 on the basis of the plurality of blur characteristics, not on the basis of only a single blur characteristic as in the preceding example.

If the derivation formula is solved for each single blur characteristic as in the preceding example (that is, if the derivation formula in which only the single blur characteristic is incorporated is solved) for the plurality of blur characteristics, only the filter coefficient w is obtained that cancels out the blur due to that blur characteristic. That is, for example, if the blur in the vertical direction is large, only the filter coefficient w is obtained that performs enhancement in the vertical direction.

On the other hand, if each filter coefficient is obtained on the basis of the plurality of blur characteristics as in [Formula 5], that is, obtained by a derivation formula in which the plurality of blur characteristics is collectively incorporated, the filter coefficient w for each blur characteristic can converge not only to have a tendency that a single blur is canceled out as in the preceding example (tendency that an enhancement in a direction in which the blur is large is increased), but also to have a tendency that the enhancement in the direction in which the blur is large is decreased and an enhancement in a direction in which the blur is small is increased. That is, for example, for the filter coefficient w used for the projector device 2 on the left side in which the blur in the vertical direction is large and the blur in the horizontal direction is small like the blur characteristic C1L for the image area A1 illustrated in FIGS. 3A, 3B, and 3C, it becomes possible to converge to the filter coefficient w that makes the enhancement in the vertical direction small and makes the enhancement in the horizontal direction small. Furthermore, for the filter coefficient w used for the projector device 2 on the right side in which the blur in the horizontal direction is large and the blur in the vertical direction is small like the blur characteristic C1R for the image area A1, it becomes possible to converge to the filter coefficient w that makes the enhancement in the vertical direction large and makes the enhancement in the horizontal direction small. As a result of summing up the corrections by the filter coefficients w, the synthetic blur due to the two blur characteristics is appropriately corrected for the image area A1. That is, the enhancement in the horizontal direction of the projector device 2 on the left side functions as a correction for a horizontal direction blur that occurs in the projection image of the projector device 2 on the right side, and the enhancement in the vertical direction of the projector device 2 on the right side functions as a correction for a vertical direction blur that occurs in the projection image of the projector device 2 on the left side, and the correction for the synthetic blur is performed appropriately by the sum of the two corrections.

As described above, if it is possible to perform enhancement in the direction in which the blur is small mutually for each blur characteristic and to correct the synthetic blur by the sum of those corrections, it is possible to increase an amount of the blur that can be corrected more than in a case where the method is adopted of performing enhancement in the direction in which the blur is large as in the preceding example. That is, it is possible to improve correction performance for the synthetic blur, and further improve image quality.

Note that, in the above, the derivation formula has been exemplified for the synthetic blur in a case where the two projector devices 2 perform the superimposed projection; however, for the derivation formula in a case where the n projector devices 2 perform the superimposed projection, a derivation formula is used in which the blur characteristics of the respective projector devices 2, that is, n blur characteristics are collectively incorporated.

Furthermore, the derivation formula described above is a formula that derives a correction filter coefficient for a blur that occurs in one image area, and to perform the blur correction in the entire area of the superimposed projection image Pp, the filter coefficient w of each projector device 2 is obtained by a similar derivation formula for each of a plurality of required image areas in the image.

[1-4. Image Processing Device as First Embodiment]

The image processing device 1 of the first embodiment is configured to acquire the filter coefficient w corresponding to each projector device 2 by using a look-up table (LUT) 10 that stores the filter coefficient w obtained by the derivation formula in which the plurality of blur characteristics is collectively incorporated in one set as in [Formula 5] described above.

Figure 5:
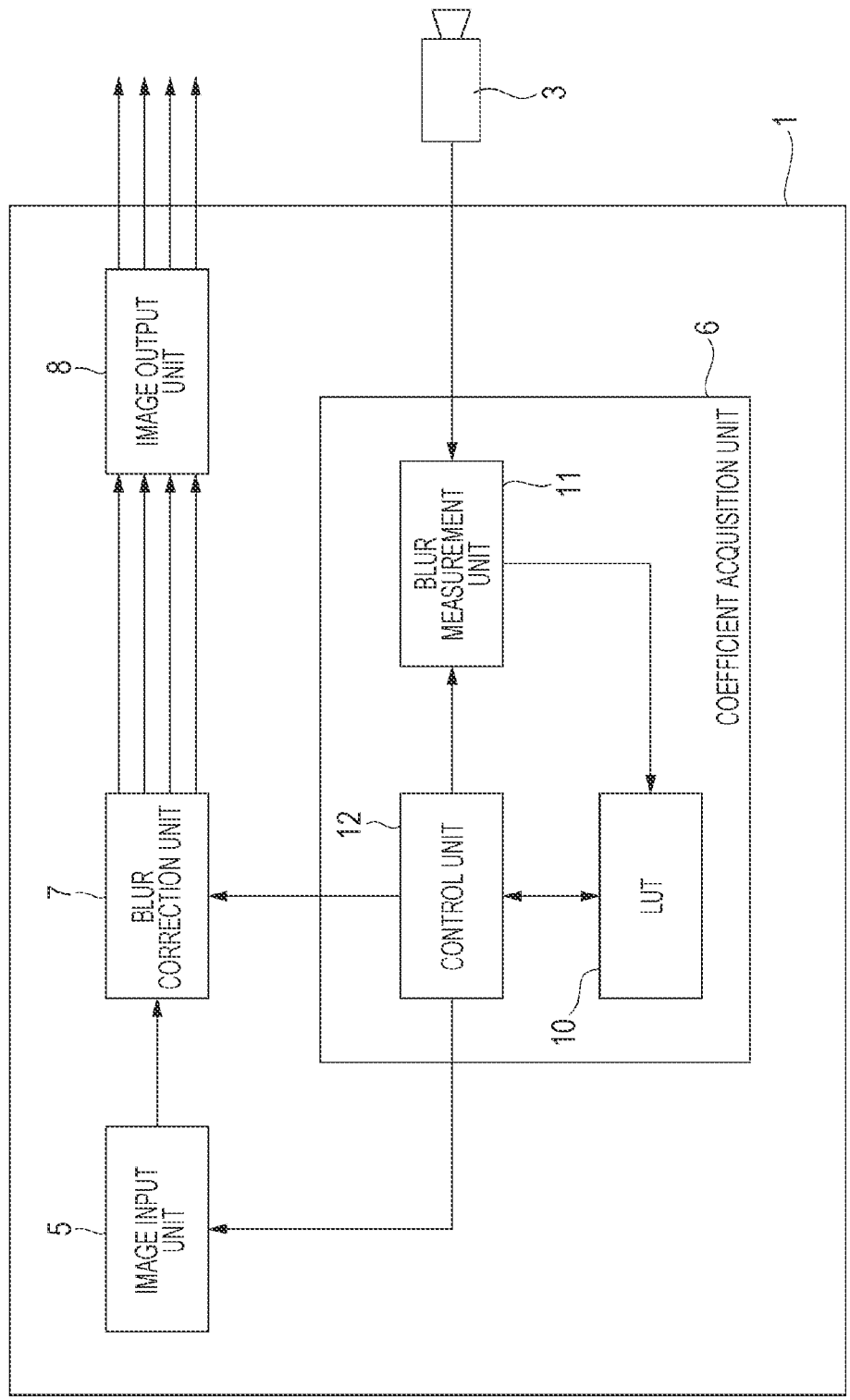
FIG. 5 is a block diagram for explaining a configuration example of the image processing device of a first embodiment.

FIG. 5 is a block diagram for explaining a configuration example of the image processing device 1. Note that, FIG. 5 also illustrates the imaging device 3 illustrated in FIG. 1 together with the configuration example of the image processing device 1.

In the following description, portions similar to those already described are designated by the same reference numerals and the description thereof will be omitted.

As described in FIG. 2 above, the image processing device 1 includes the image input unit 5, the coefficient acquisition unit 6, the blur correction unit 7, and the image output unit 8.

The coefficient acquisition unit 6 includes the LUT 10, and also includes a blur measurement unit 11 and a control unit 12. The LUT 10 stores the filter coefficient w for each image area of each projector device 2 obtained in advance by using a derivation formula such as [Formula 5] for each of installation conditions of each projector device 2. The installation condition here means a condition regarding at least an arrangement position of each projector device 2 that performs the superimposed projection, and is, for example, a condition of a positional relationship with respect to the projection plane of each projector device 2.

Here, in the first embodiment, a manufacturer of the image processing device 1, for a plurality of the installation conditions assumed in an actual environment where the image projection system is actually used, that is, an environment where an actual superimposed projection is performed, performs measurement of the blur characteristic of each projector device 2 for each of the installation conditions, under an environment different from the actual environment in advance, and solves the derivation formula such as [Formula 5] by using the measured blur characteristic, thereby obtaining the filter coefficient w for each image area of each projector device 2 for each of the installation conditions.

The manufacturer causes the filter coefficient w for each image area of each projector device 2 thus obtained to be stored in the LUT 10 for each of the installation conditions.

Figure 6:
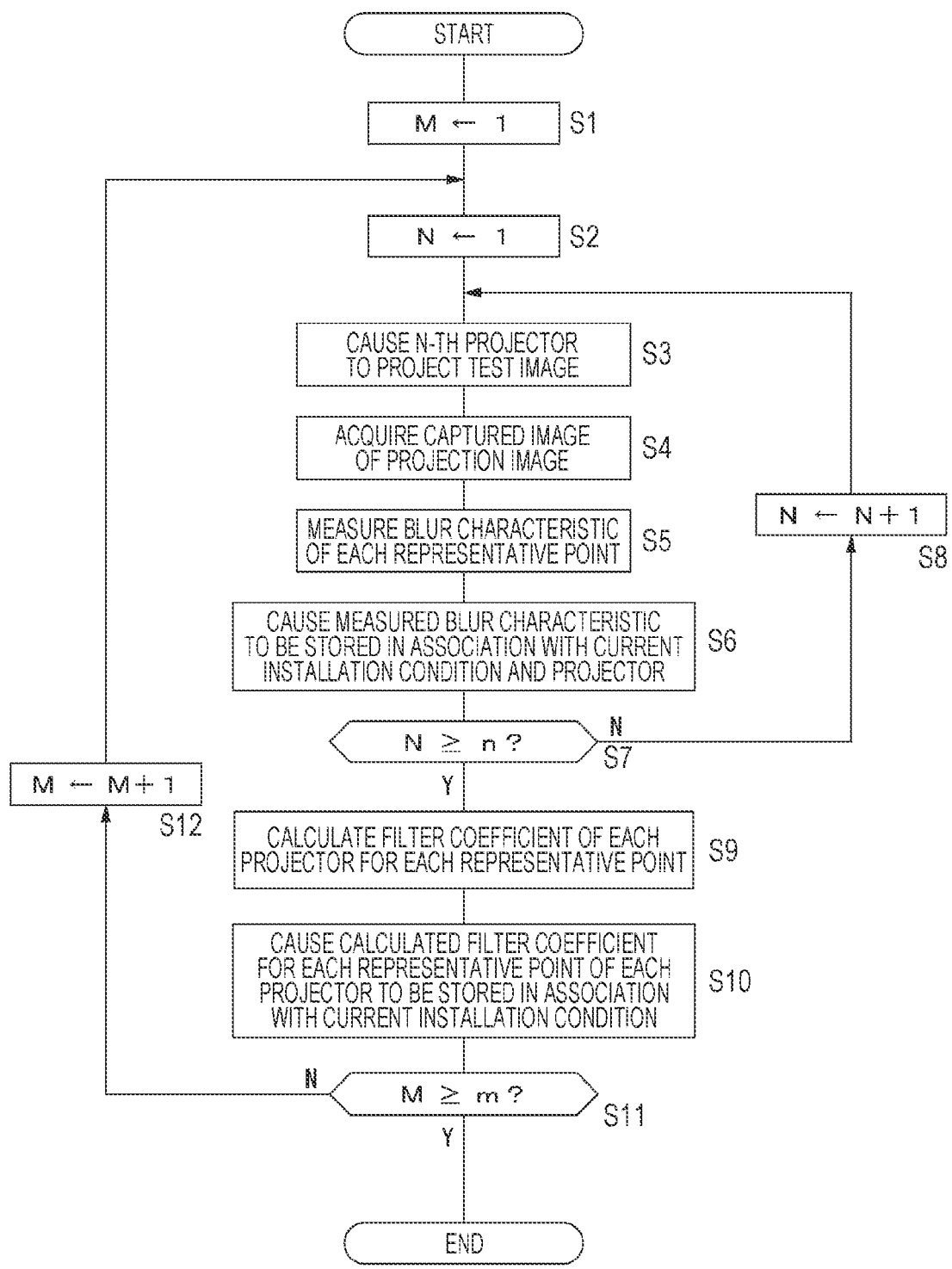
FIG. 6 is a flowchart illustrating an example of a procedure for obtaining each of filter coefficients to be stored in a look-up table (LUT).

Specifically, on the manufacturer side, in the environment different from the actual environment, for example, in a pre-factory-shipment environment of the image processing device 1 (hereinafter also referred to as "pre-shipment environment"), each filter coefficient w to be stored in the LUT 10 is obtained by a procedure as illustrated in FIG. 6, for example.

First, in the pre-shipment environment, the manufacturer arranges the n projector devices 2 in a predetermined positional relationship defined as the first installation condition (step S1). Here, the number of types of installation environment assumed in advance on the manufacturer side is "m" (m is a natural number of greater than or equal to 2), and "M" in the figure means an identifier of the installation condition.

Each projector device 2 used in a pre-shipment stage does not have to be the same individual as the projector device 2 used in the actual environment.

Next, the first projector device 2 is selected from among the n projector devices 2 (step S2). That is, the first projector device 2 is selected from among the first to nth projector devices 2. "N" in the figure means an identifier of the projector device 2.

Next, the selected projector device 2 is caused to project a test image (step S3). In the present example, as the test image, an image is used in which o representative points (o is a natural number of greater than or equal to 2) is set. For example, as the representative points, five or more points are set including a total of five points at the center and four corners of the image, and as the test image, for example, an image is used in which only the pixels corresponding to those representative points are caused to emit light.

Subsequently, the captured image of the projection image is acquired (step S4). That is, in a state where the selected projector device 2 projects the test image, the imaging device is caused to image the projection plane to obtain the captured image.

Then, the blur characteristic of each representative point is measured (step S5).

Figure 7:
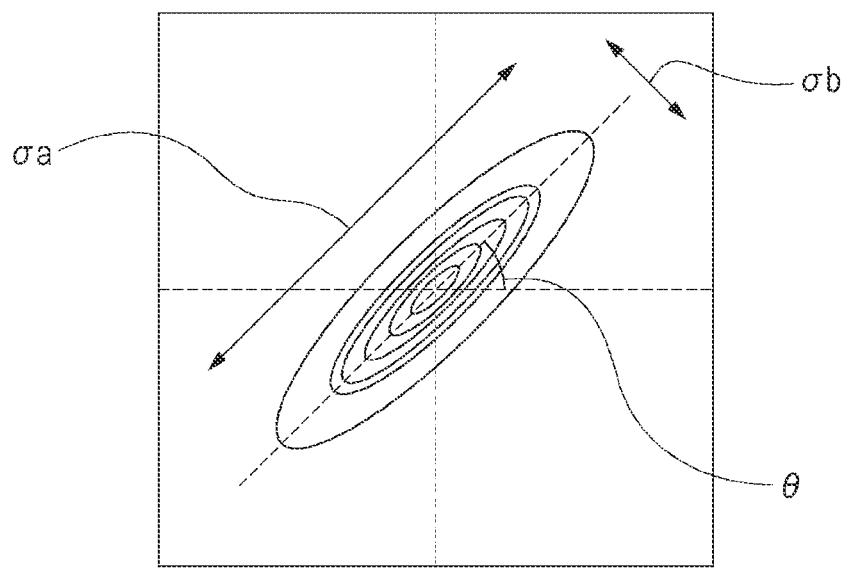
FIG. 7 is a diagram for explaining an example of data of a simplified model of a blur.

At this time, data of the blur characteristic may be data representing a point spread function, but in the present example, to reduce the data capacity, for example, data of a simplified model of a blur as illustrated in FIG. 7 is adopted. The simplified model illustrated in FIG. 7 represents the blur characteristic simply on the premise that the spread of the blur on the projection plane is a normal distribution, and represents the blur characteristic by using degrees of blur in respective directions ($\sigma a$, $\sigma$) and an angle $\theta$ for defining a direction of the blur. The $\sigma a$ and $\sigma b$ respectively represent the degrees of blur in the directions orthogonal to each other.

Note that, the specific data representing the blur characteristic is not particularly limited, and can be, for example, coefficient data of a Low Pass Filter (LPF).

Referring back to FIG. 6, the description will be continued.

In step S6 subsequent to step S5, the measured blur characteristic is caused to be stored in association with the current installation condition and the projector device 2. That is, the data of each blur characteristic obtained by the measurement in step S5 is caused to be stored in a required storage device in association with information representing the current installation condition and the currently selected projector device 2.

Next, in step S7, it is determined whether or not the blur characteristics are measured for all the n projector devices 2 (N≥n), and in a case where the blur characteristics are not measured for all the projector devices 2, the next projector device 2 is selected (N←N+1) in step S8, and the processing returns to step S3. As a result, the blur characteristic of the next projector device 2 is measured and stored.

On the other hand, in a case where it is determined in step S7 that the blur characteristics are measured for all the projector devices 2, the filter coefficient w of each projector device 2 is calculated for each representative point in step S9. That is, the filter coefficient w of each projector device 2 is calculated for each representative point on the basis of the derivation formula in which the blur characteristics (n blur characteristics) of the respective projector devices 2 are collectively incorporated in one set. The derivation formula of [Formula 5] above corresponds to the case where the superimposed projection is performed by the two projector devices 2, and terms subtracted from the ideal value y are two terms respectively including the blur characteristic $\varphi$ and the blur characteristic $\Phi$; however, for the derivation formula used in step S9, a formula is used that subtracts n terms each including a corresponding one of the blur characteristics measured for the respective projector devices 2 for a target representative points from the ideal value y.

In subsequent step S10, the calculated filter coefficient w for each representative point of each projector device 2 is caused to be stored in a required storage device in association with the current installation condition.

The filter coefficient w for each representative point of each projector device 2 can be obtained for the first installation condition by the procedure of steps S1 to S10 so far.

Next, in step S11, it is determined whether or not the filter coefficient w is obtained for all the m installation conditions (M≥m), and in a case where the filter coefficient w is not obtained for all the installation conditions, the projector devices 2 are arranged in a positional relationship corresponding to the next installation condition (M←M+1) in step S12, and the processing proceeds to step S2. As a result, for the next installation condition, the blur characteristic is measured for each representative point of each projector device (S3 to S8), and the filter coefficient w is calculated and stored for each representative point of each projector device 2 based on the measured blur characteristic (S9 to S10).

Then, such calculation and storage of the filter coefficient w are repeated, and in response to the fact that it is determined in step S11 that the filter coefficient w is obtained for all the installation conditions, a series of procedures illustrated in FIG. 6 ends.

In the LUT 10 of the present example, for example, the filter coefficient w for each representative point of each projector device 2 obtained by the procedure described above is stored for each of the installation conditions.

FIG. 8 illustrates an example of storage information of the LUT 10.

Note that, in FIG. 8, a case is exemplified where the number of types of the blur characteristic is p of from 1 to p, and the number of types of the filter coefficient w (types of the combination of the filter coefficients w) is r of from 1 to r.

As illustrated in the figure, in the LUT 10, the filter coefficient w for each representative point (image area) of each projector device 2 is stored in association with each of the plurality of installation conditions assumed in advance.

In the LUT 10 of the present example, for each installation condition, data of the blur characteristic for each representative point of each projector device 2 measured under the installation condition is also stored.

Referring back to FIG. 5, the description will be continued.

In the coefficient acquisition unit 6, the blur measurement unit 11 measures the blur characteristic for each representative point of each projector device 2 in the actual environment on the basis of the captured image input from the imaging device 3.

The control unit 12 includes a microcomputer including, for example, a CPU, a Read Only Memory (ROM), a Random Access Memory (RAM), and the like, and executes processing according to a program stored in, for example, the ROM, thereby performing various types of operation control of the image processing device 1.

In particular, the control unit 12 in this case acquires the filter coefficient w corresponding to the installation condition of each projector device 2 from the LUT 10 on the basis of the blur characteristic measured by the blur measurement unit 11 in the actual environment, and performs control of causing the acquired filter coefficient w to be set for each blur correction filter 7a in the blur correction unit 7.

[1-5. Processing Procedure]

With reference to the flowchart of FIG. 9, a specific processing procedure will be described that is executed by the control unit 12 (CPU) to acquire the filter coefficient w from the LUT 10.

First, the control unit 12 sets a projector identifier N to "1" in step S101, and then causes the N-th projector device 2 to project the test image in step S102. That is, an instruction to the image input unit 5 is given, and the test image is caused to be input to the blur correction unit 7. At this time, the blur correction unit 7 is instructed to turn off the blur correction function so that the input test image is input to the image output unit 8 without undergoing the blur correction processing. Furthermore, at this time, the image output unit 8 is instructed to output the test image only to the N-th projector device 2.

Next, in step S103, the control unit 12 performs processing for acquiring the captured image of the projection image. That is, the blur measurement unit 11 is caused to acquire the captured image by the imaging device 3.

Moreover, the control unit 12 performs processing of causing the blur measurement unit 11 to measure the blur characteristic of each representative point in the acquired captured image, as processing for measuring the blur characteristic of each representative point, in next step S104, and performs processing for storing the measured blur characteristic in association with the current projector device 2, in step S105. That is, the blur characteristic for each representative point caused to be measured by the blur measurement unit 11 is caused to be stored in a predetermined storage device (for example, the RAM of the control unit 12, or the like) in association with the current projector device 2 (current projector identifier N).

Next, the control unit 12 determines whether or not the projector identifier N is greater than or equal to n (N≥n) in step S106, and if N≥n is not satisfied, increments a value of the projector identifier N by 1 (N←N+1) in step S107, and returns to step S102.

On the other hand, if N≥n is satisfied, the control unit 12 proceeds to step S108, and performs matching of the installation condition based on the combination of the measured blur characteristics. That is, among the installation conditions in the LUT 10, an installation condition is specified in which the combination of the blur characteristics for each representative point of each projector device 2 matches the combination of the blur characteristics for each representative point of each projector device 2 acquired by the processing of steps S101 to S107.

As a method of the matching, in the present example, a method is adopted of specifying an installation condition that minimizes an error of the blur characteristic. Specifically, for each of the installation conditions in the LUT 10, an error between the stored blur characteristic and the blur characteristic acquired by steps S101 to S107, and a sum total of those errors are calculated, and an installation condition that makes the calculated total error minimum is specified as a setting condition that matches. That is, it is specified as an installation condition that matches the installation condition in the actual environment.

Figure 9:
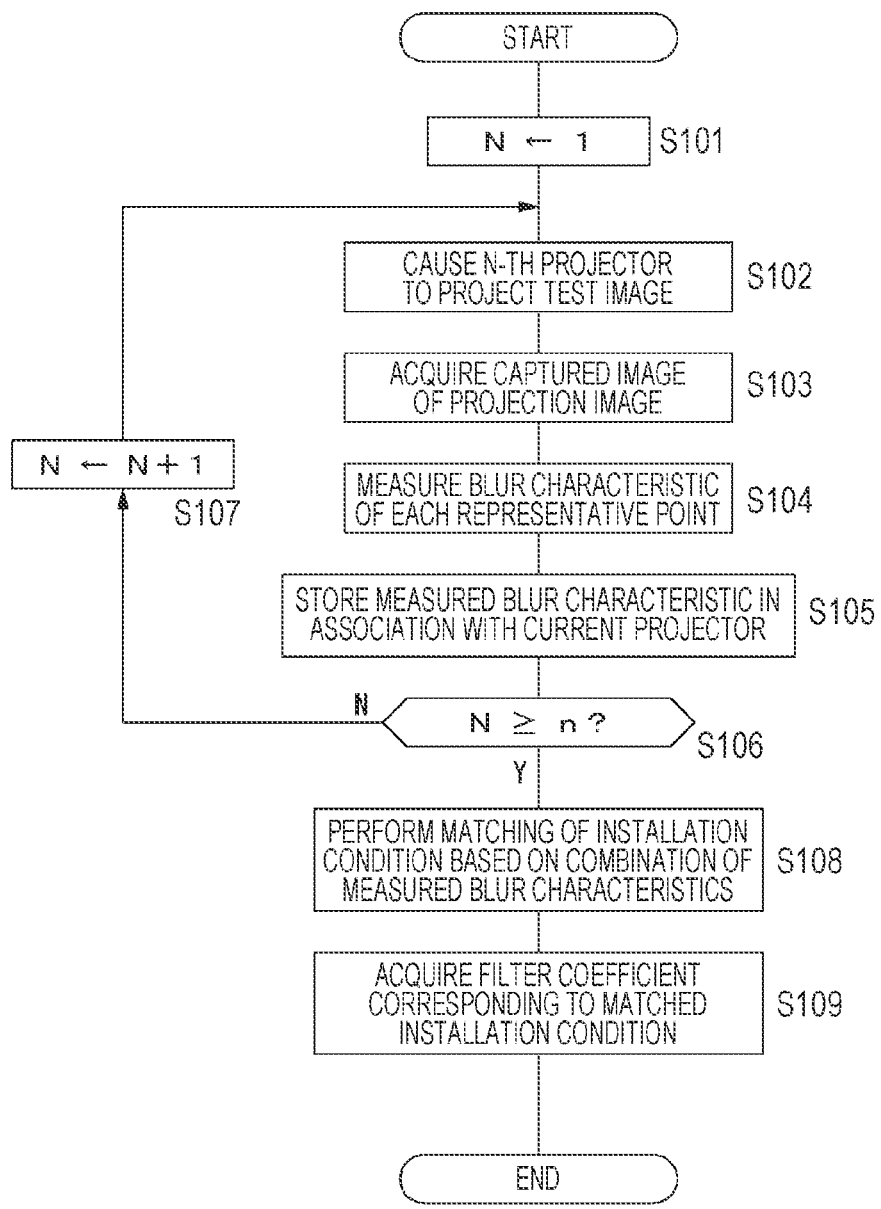
FIG. 9 is a flowchart illustrating an example of a processing procedure to be executed to acquire the filter coefficients from the LUT.

In subsequent step S109, the control unit 12 acquires the filter coefficient w corresponding to the matched installation condition, and ends a series of processing steps illustrated in FIG. 9.

By the processing in step S109, the filter coefficient w (the filter coefficient for each representative point) to be set for each projector device 2, that is, for each blur correction filter 7a is acquired corresponding to the installation condition in the actual environment.

Note that, in the above, an example has been described in which the blur characteristic for each representative point of each projector device 2 in the actual environment is acquired on the basis of the captured image of the imaging device 3; however, information representing the blur characteristic for each representative point of each projector device 2 (information representing the combination of the blur characteristics) can also be acquired on the basis of a user's operation input.

As a result, it becomes unnecessary to provide the imaging device 3 in the actual environment when acquiring the filter coefficient w for the blur correction, and it is possible to achieve simplification of the configuration and reduction of the cost of the image projection system.

Note that, this point is similar in the second and third embodiments described below.

Here, if the method for performing the blur measurement using the imaging device 3 is used, it is possible to acquire the corresponding filter coefficient w on the basis of the actually measured blur characteristic, so that an appropriate filter coefficient corresponding to the characteristic of the blur that occurs in the actual environment can be acquired and used for the blur correction. Thus, the blur correction performance can be further improved.

In the first embodiment, since the method is adopted of acquiring the filter coefficient w by using the LUT 10, it becomes unnecessary to perform calculation processing for deriving the filter coefficient w using the derivation formula such as [Formula 5] in the actual environment. Thus, in the image processing device 1 used in the actual environment, it is possible to reduce the processing load for implementing the blur correction.

2. Second Embodiment

[2-1. Image Processing Device as Second Embodiment]

An image processing device 1A as a second embodiment will be described with reference to FIGS. 10 and 11.

The image processing device 1A of the second embodiment has a function of deriving the filter coefficient w for the blur correction on the basis of the derivation formula such as [Formula 5] on the basis of the blur characteristic in the actual environment.

Figure 10:
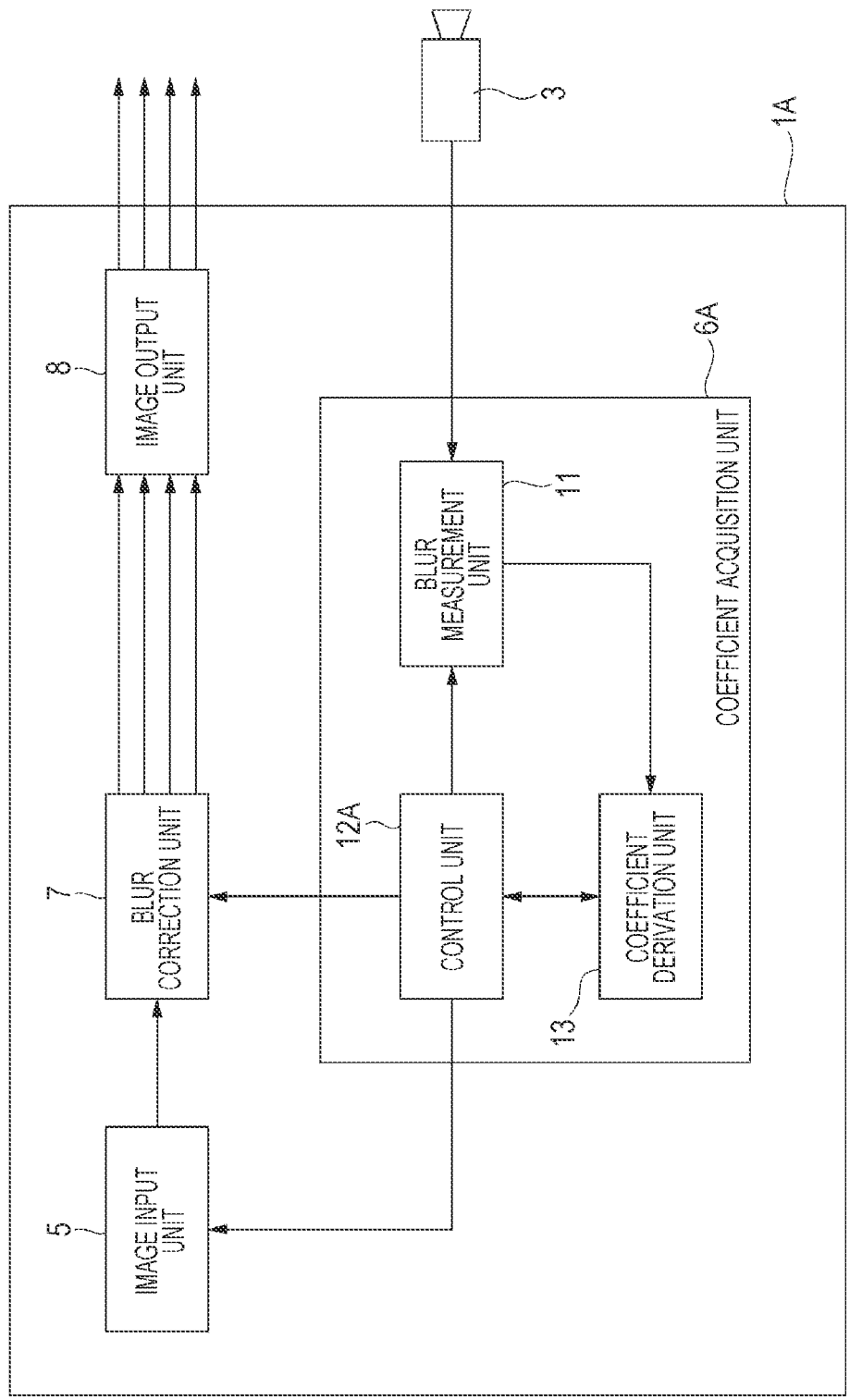
FIG. 10 is a block diagram for explaining a configuration example of an image processing device of a second embodiment.

FIG. 10 is a diagram for explaining a configuration example of the image processing device 1A, and also illustrates the imaging device 3 together with the configuration example of the image processing device 1A, similarly to FIG. 5.

A difference from the image processing device 1 of the first embodiment is that a coefficient acquisition unit 6A is provided instead of the coefficient acquisition unit 6, and in comparison with the coefficient acquisition unit 6, the coefficient acquisition unit 6A is provided with a control unit 12A instead of the control unit 12, and the LUT 10 is omitted and a coefficient derivation unit 13 is provided.

The coefficient derivation unit 13 calculates the filter coefficient w for each representative point of each projector device 2 on the basis of the blur characteristic measured by the blur measurement unit 11, that is, the blur characteristic of each representative point of each projector device 2, in accordance with the derivation formula such as [Formula 5]. Specifically, the filter coefficient w for each representative point of each projector device 2 is calculated by using the derivation formula in which the n blur characteristics measured for each projector device 2 for a target representative point are collectively incorporated. More specifically, the derivation formula in this case also includes a formula for obtaining, for each of the blur characteristics, a difference between a sum total of values obtained by performing blur addition processing based on the blur characteristics and the blur correction processing based on the filter coefficient w on a pixel value of a target image, and a predetermined ideal value, and the coefficient derivation unit 13 obtains the filter coefficient w that reduces the difference, by calculation.

The control unit 12A performs processing for causing the blur measurement unit 11 to measure the blur characteristic and causing the coefficient derivation unit 13 to execute the calculation of the filter coefficient w.

[2-2. Processing Procedure]

Figure 11:
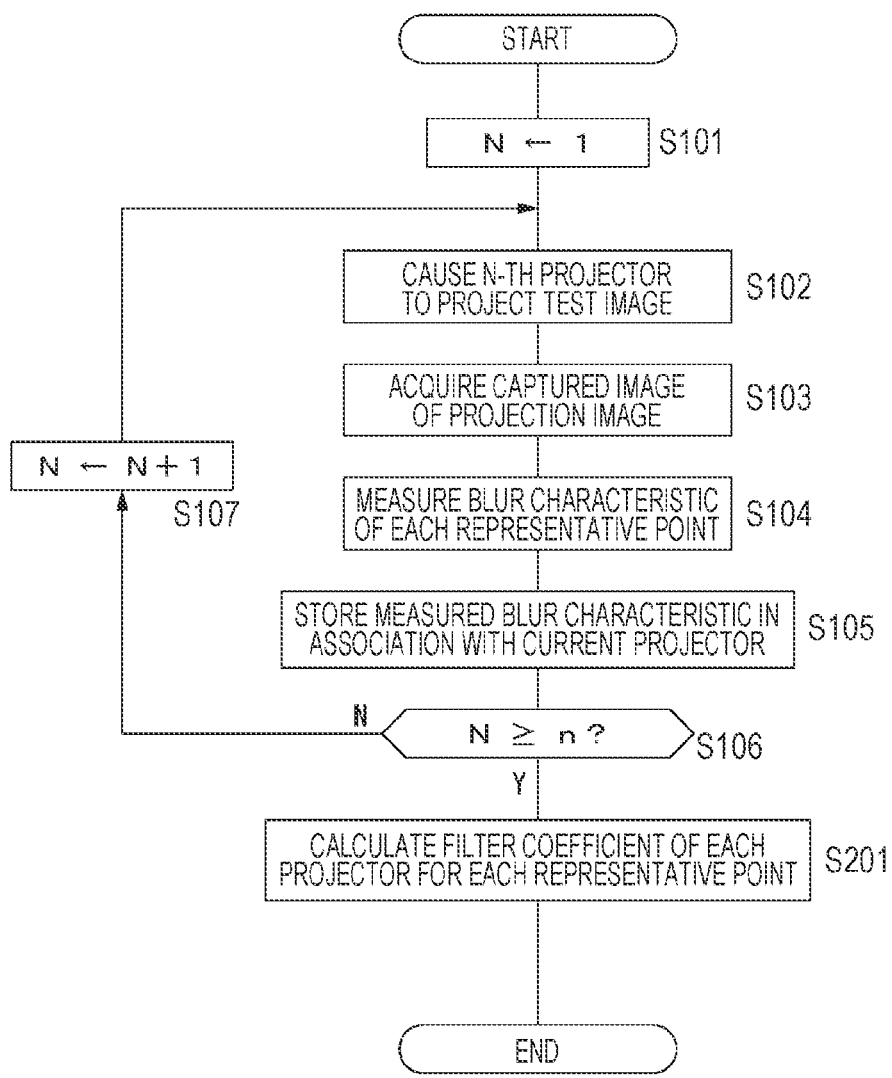
FIG. 11 is a flowchart illustrating an example of a processing procedure to be executed by a coefficient acquisition unit in the second embodiment to acquire the filter coefficients.

FIG. 11 is a flowchart illustrating a specific processing procedure executed by the control unit 12A to acquire the filter coefficient w in the actual environment.

First, similarly to the control unit 12, the control unit 12A also executes the processing of steps S101 to S107. That is, as a result, the blur characteristic can be obtained that is measured for each representative point of each projector device 2 in the actual environment.

In a case where it is determined in step S106 that the projector identifier N is greater than or equal to n, the control unit 12A executes processing for causing the filter coefficient w of each projector device 2 for each representative point to be calculated in step S201. That is, an instruction to the coefficient derivation unit 13 is given so that the coefficient derivation unit 13 calculates the filter coefficient w for each representative point of each projector device 2 on the basis of the blur characteristic for each representative point of each projector device 2 obtained by the processing of step S107.

The control unit 12A ends a series of processing illustrated in FIG. 11 in response to executing the processing of step S201.

By including the coefficient derivation unit 13 that derives the filter coefficient w for the blur correction on the basis of the derivation formula like the second embodiment, an appropriate filter coefficient w corresponding to the characteristic of the blur that occurs in the actual environment can be acquired, and the blur correction performance can be further improved.

3. Third Embodiment

Subsequently, an image processing device 1B as a third embodiment will be described with reference to FIG. 12.

Figure 12:
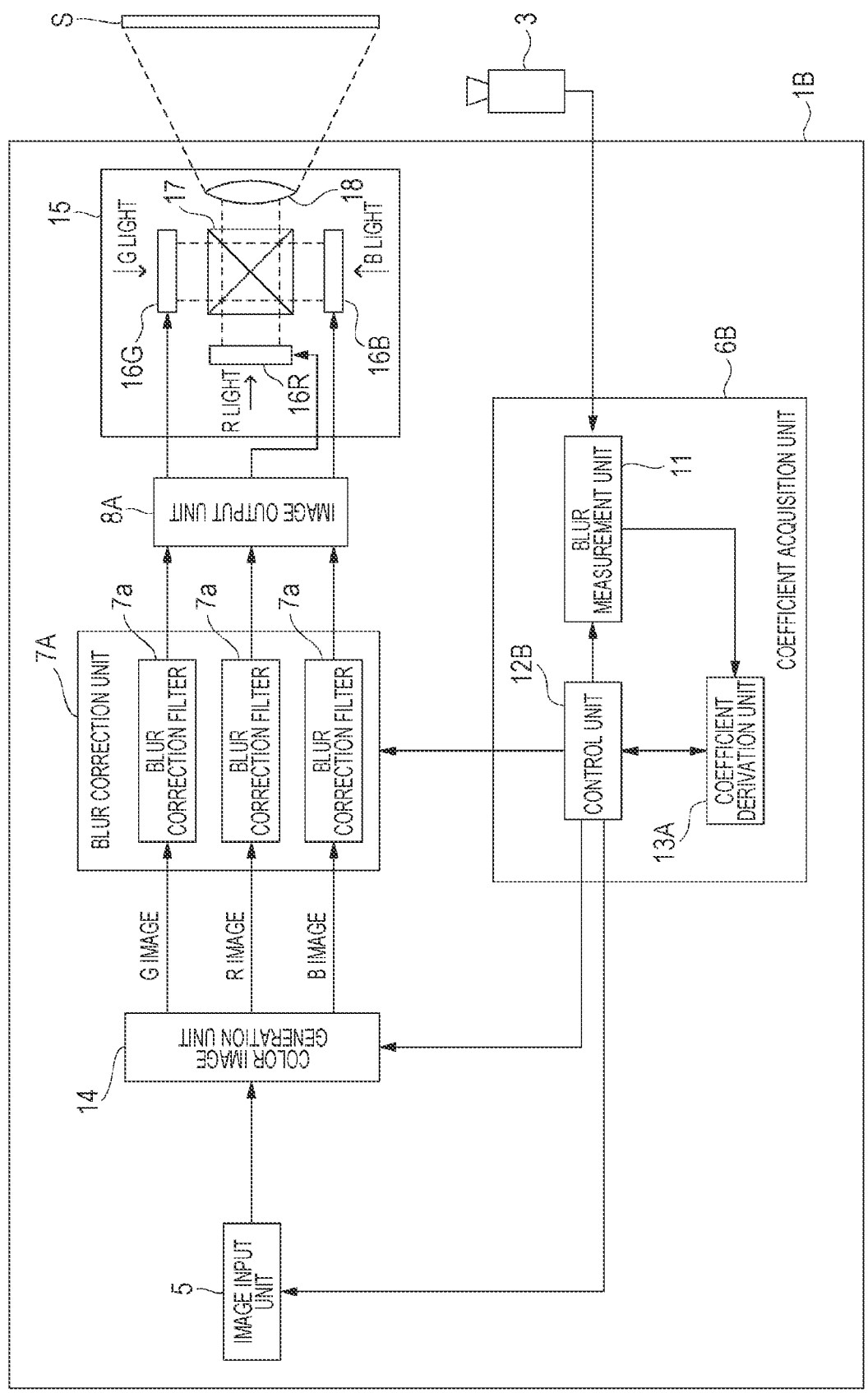
FIG. 12 is a block diagram for explaining a configuration example of an image processing device of a third embodiment.

FIG. 12 is a diagram for explaining a configuration example of the image processing device 1B as the third embodiment, and also illustrates the imaging device 3 and the screen S together with the configuration example of the image processing device 1B.

The image processing device 1B is not applied to a system that performs the superimposed projection by the plurality of projector devices 2 as illustrated in FIG. 1, but is applied to a single projector device that performs projection of a color image.

The image processing device 1B is configured as a transmissive liquid crystal projector device that performs projection of a color image.

As illustrated in the figure, the image processing device 1B includes the image input unit 5, a coefficient acquisition unit 6B, a color image generation unit 14, a blur correction unit 7A, an image output unit 8A, and an optical system 15.

The color image generation unit 14 generates images of respective colors of R, G, and B on the basis of an input image (color image) by the image input unit 5.

The blur correction unit 7A includes three blur correction filters 7a corresponding to the respective colors of R, G, and B, and each blur correction filter 7a performs blur correction processing based on the filter coefficient w on a corresponding one of the images of an R image, a G image, and a B image output by the color image generation unit 14.

As illustrated in the figure, the optical system 15 is provided with, as a transmissive liquid crystal panel 16, a liquid crystal panel 16G that performs spatial light modulation on G light, a liquid crystal panel 16R that performs spatial light modulation on R light, and a liquid crystal panel 16B that performs spatial light modulation on B light, and also a color synthesis prism 17 and a projection lens (projection optical system) 18. In the optical system 15, light emitted from a light source (not illustrated) is color-separated into the R light, G light, and B light by a color separation element such as a dichroic mirror, and the separated light beams are respectively incident on the liquid crystal panels 16 of the corresponding colors.

Image lights of the R light, G light, and B light subjected to spatial light modulation by the liquid crystal panels 16R, 16G, and 16B are emitted toward a projection lens 18 by the color synthesis prism 17, and are projected on the screen S through the projection lens 18.

The image output unit 8A inputs the R image, the G image, and the B image from the blur correction unit 7A, and outputs them to the liquid crystal panels 16 of the corresponding colors. As a result, the R light is subjected to spatial light modulation based on the R image, the G light is subjected to spatial light modulation based on the G image, and the B light is subjected to spatial light modulation based on the B image.

The coefficient acquisition unit 6B is different from the coefficient acquisition unit 6A of the second embodiment in that a control unit 12B is provided instead of the control unit 12A, and a coefficient derivation unit 13A is provided instead of the coefficient derivation unit 13.

Here, in a projector device that projects a color image, characteristics of focus blur may differ between projection images of respective colors due to, for example, wavelength differences between the light beams of the respective colors such as R, G, and B. That is, the projection image of each color may have different blur characteristic in each area in the image, similarly to the projection image of each projector device 2 in the first and second embodiments.

Thus, in the third embodiment, the coefficient derivation unit 13A is provided in the coefficient acquisition unit 6B so that a synthetic blur in a color projection image can be corrected, the synthetic blur occurring due to synthesis of the blurs that occur in the projection images of the respective colors.

The coefficient derivation unit 13A obtains the filter coefficient w for each of the images of R, G, and B on the basis of a derivation formula of [Formula 6] below.

[Expression 6]

$$Q = y - \sum_j \varphi R_j \left(\sum_i wR_i R_i\right) - \sum_j \varphi G_j \left(\sum_i wG_i G_i\right) - \sum_j \varphi B_j \left(\sum_i wB_i B_i\right)$$ [Formula 6]

Here, "φR", "φG", and "φB" respectively mean the blur characteristics of the projection images of R, G, and B, "wR", "wG", and "wB" respectively mean the filter coefficients w of the blur correction filters of the R image, the G image, and the B image, and "R", "G", and "B" respectively mean pixel values of the R image, the G image, and the B image. In this case, "y" means an ideal value of a pixel value of the color projection image in which the images of the R light, G light, and B light are synthesized (for example, a pixel value as an ideal value obtained in an ideal state where a blur does not occur).

The coefficient derivation unit 13A obtains filter coefficients wR, wG, and wB that reduce the error Q in [Formula 6] for each representative point. As a result, the filter coefficients wR, wG, and wB for correcting the synthetic blur can be obtained corresponding to a case where blurs having different characteristics respectively occur for R, G, and B in the color projection image.

In this case, the control unit 12B performs control so that the blur characteristic for each representative point is measured for each of the R image, the G image, and the B image by the blur measurement unit 11. Specifically, the control unit 12B gives an instruction to the image input unit 5 and the color image generation unit 14 so that only a test image of the R image is projected on the screen S. Also in this case, the blur correction processing is not performed on the test image. Then, in a state where the test image of the R image is projected, the blur measurement unit 11 is caused to acquire the captured image by the imaging device 3, and to measure the blur characteristic for each representative point on the basis of the captured image. The processing for measuring the blur characteristic for each representative point of the test image is similarly performed for the G image and the B image in this way, and the blur characteristic for each representative point of each of the projection images of R, G, and B is caused to be measured.

The control unit 12B causes the coefficient derivation unit 13A to calculate the filter coefficients wR, wG, and wB for each representative point, on the basis of the blur characteristic for each representative point of each of the projection images of R, G, and B measured in this way. Then, the blur correction filter 7a for the R image in the blur correction unit 7A is caused to set the filter coefficient wR, the blur correction filter 7a for the G image is caused to set the filter coefficient wG, and the blur correction filter 7a for the B image is caused to set the filter coefficient wB.

As a result, it is possible to perform correction of the synthetic blur corresponding to a case where blurs due to different characteristics for respective colors occur in the color projection image.

Note that, in the third embodiment, the filter coefficients wR, wG, and wB can be acquired by using the LUT as in the first embodiment, without using the coefficient derivation unit 13A. Since the blurs that occur in the projection images of R, G, and B differ depending on the installation condition with respect to the projection plane of the image processing device 1B (projector device), in the LUT in this case, the blur characteristic and the corresponding filter coefficients wR, wG, and wB for each installation condition are stored similarly to the case of the first embodiment, and the control unit 12B acquires the corresponding filter coefficients wR, wG, and wB from the LUT on the basis of the blur characteristic of each of the projection images of R, G, and B in the actual environment.

Furthermore, in the above, an example has been described in which the imaging device 3 is provided separately from the image processing device 1B; however, the imaging device 3 can also be provided integrally with the image processing device 1B.

Furthermore, in the above, an example has been described in which the spatial light modulator included in the projector device is the transmissive liquid crystal panel 16; however, a reflective liquid crystal panel can also be used as the spatial light modulator. Note that, the spatial light modulator is not limited to a liquid crystal panel, and, for example, a Digital Micromirror Device (DMD) or the like is used.

4. Modifications

Note that, the present technology is not limited to the specific examples described above, and various modifications are conceivable.

For example, in a case where the filter coefficient w is acquired by using the LUT in the actual environment as in the first embodiment, the number of blur characteristics measured in the actual environment may be greater than the number of blur characteristics in the LUT (that is, the number of blur characteristics that occur under the installation condition assumed in the pre-shipment environment). For example, in the example of the LUT 10 illustrated in FIG. 8, the number of blur characteristics in the pre-shipment environment is o from 1 to o; however, the number of blur characteristics measured in the actual environment may be q that is greater than o.

Figure 13:
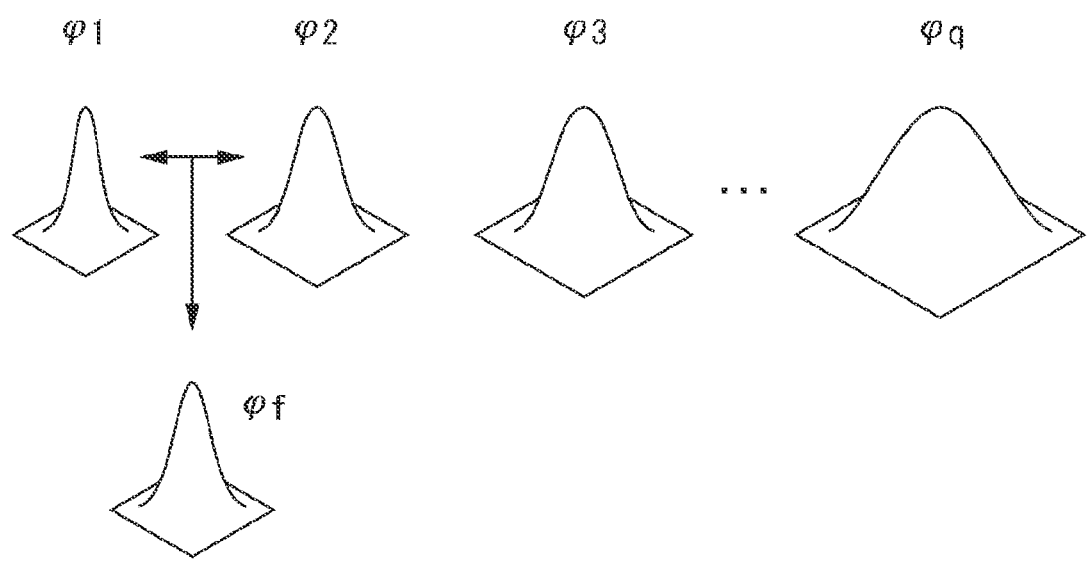
FIG. 13 is a diagram for explaining an example of unifying blur characteristics.

In such a case, for example, as illustrated in FIG. 13, for the blur characteristics measured in the actual environment (here, q from φ1 to φq), matching is performed between the blur characteristics, and the blur characteristics in an approximation relationship are unified. Examples of the unification include averaging data of two blur characteristics having an approximation relationship. In the figure, the blur characteristic φ1 and the blur characteristic φ2 are in an approximation relationship, and an example is illustrated in which the blur characteristics φ1 and φ2 are averaged to be unified into the blur characteristic φf. By such unification, the types of the blur characteristics measured in the actual environment can be reduced.

By unifying the blur characteristics as described above as necessary, the filter coefficients for the blur correction can be appropriately acquired corresponding to a case where there are more types of actually measured blur characteristics than types of the blur characteristics included in the LUT.

Note that, in the above, an example has been described in which when the filter coefficient is acquired from the LUT, the installation condition that minimizes the error of the blur characteristic is specified and the filter coefficient associated with the specified installation condition is acquired; however, when the blur characteristics are unified as described above, for the filter coefficient corresponding to the unified blur characteristic, the acquired filter coefficient is not used for the blur correction as it is, but the acquired filter coefficient is divided by the number of unification targets F (the number of blur characteristics of the unification source). For example, in a case where two blur characteristics are averaged as the unification, F=2 is set and the acquired filter coefficient is divided by "2". At this time, the filter coefficients used for the blur correction are normalized so that the sum total of them is "1".

Here, as described in the first and second embodiments, in the method of deriving the filter coefficient w by the derivation formula such as [Formula 5], as the blur correction for each projector device 2, it is possible to perform correction that makes an enhancement small in a direction in which the blur is large, that is, in a direction in which original image information is greatly lost, and makes an enhancement large in a direction in which the blur is small, that is, in a direction in which the original image information is not greatly lost, and with the total of those corrections, it is possible to effectively correct the synthetic blur that occurs in the superimposed projection image Pp.

Figure 14A:
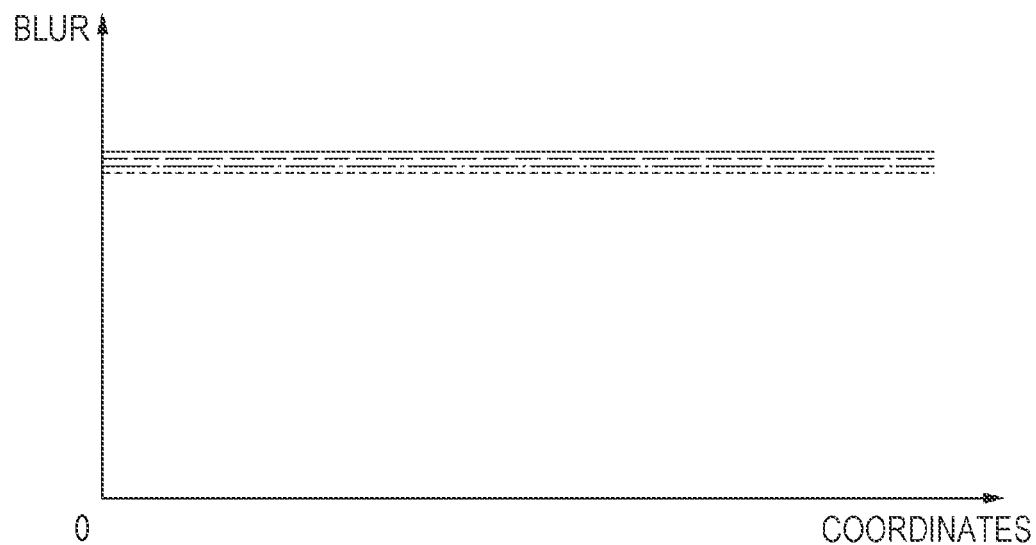
FIGS. 14A and 14B is are diagrams for explaining an example of focus adjustment of each of image projection devices.
Figure 14B:
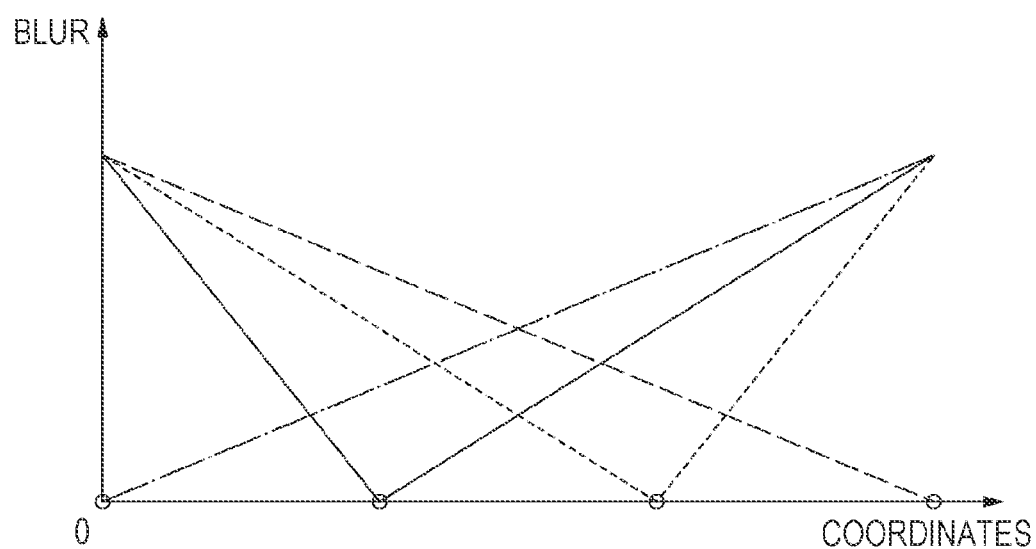

In view of such a blur correction characteristic as the embodiment, the focus of each projector device 2 can obtain a higher blur correction effect in a case where adjustment is performed so that each projector device 2 adjusts the focus on a different position on the projection plane as exemplified in FIG. 14B than in the case of a normal adjustment method as exemplified in FIG. 14A, that is, in a case where the adjustment is performed so that the focus is adjusted substantially uniformly in the entire projection plane.

For example, in a case where four projector devices 2 are arranged in the horizontal direction and the superimposed projection is performed as illustrated in FIG. 1 above, when the four projector devices 2 are sequentially the first to fourth projector devices 2 from the left end, for example, as exemplified in FIG. 14B, the first projector device 2 (chain line) is adjusted so that the focus is adjusted at the left end of the projection plane, and the second projector device 2 (solid line) on the right side of the first projector device 2 is adjusted so that the focus is adjusted at a position slightly left of the center of the projection plane. Furthermore, the third projector device 2 (short dashed line) is adjusted so that the focus is adjusted at a position slightly right of the center of the projection plane, and the fourth projector device 2 (long dashed line) is adjusted so that the focus is adjusted at the right end of the projection plane.

Regarding each projector device 2 that performs the superimposed projection in this way, by adjusting each position in focus depending on the positional relationship with respect to the projection plane, it is possible to further enhance the synthetic blur correction effect corresponding to a case where the blur correction using a derivation formula such as [Formula 5] is performed.

Here, in the above, an example has been described in which the LUT 10 is provided in the image processing device 1; however, for example, the LUT 10 can also be provided in an external device that can communicate with the image processing device 1, such as an external device on a network, and it is not essential to provide the image processing device 1 with the LUT 10.

Furthermore, in the above, an example has been described in which the installation condition of the projector device 2 is a condition assuming that the n projector devices 2 are used; however, it is also possible to store, in the LUT 10, the filter coefficient w for each installation condition with the different number of installed projector devices 2 so that it is possible to support a case where the number of projector devices 2 used for the superimposed projection is variable in the actual environment.

Furthermore, in the first and second embodiments, an example has been described in which the image processing device (1 or 1A) as the embodiment is provided separately from the projector device 2; however, the image processing device can also be integrated with any projector device 2.

5. Summary of Embodiments

As described above, the image processing device of the embodiment (the image processing device 1, 1A, or 1B) includes: the correction unit (the coefficient acquisition unit 6, 6A, or 6B, and the blur correction unit 7 or 7A) that obtains the plurality of blur-corrected images by performing blur correction processing on the input image regarding the focus blur that occurs in the projection image by the image projection device, by using the filter coefficient for blur correction corresponding to each of the plurality of blur characteristics, the filter each being obtained on the basis of the plurality of blur characteristics; and the image output unit (the image output unit 8 or 8A) that individually outputs the plurality of blur-corrected images obtained by the correction unit.

By obtaining each filter coefficient for the blur correction on the basis of the plurality of blur characteristics as described above, the correction filter coefficient for each of the blur characteristics can converge not only to have a tendency that the blur itself is canceled out (that is, a tendency that an enhancement in a direction in which the blur is large is increased) as before, but also to have a tendency that the enhancement in the direction in which the blur is large is decreased and an enhancement in a direction in which the blur is small is increased.

As a result, it becomes possible to perform enhancement in the direction in which the blur is small mutually for each blur characteristic image and to correct the synthetic blur by the sum of those corrections, and thus it is possible to improve the correction performance for the synthetic blur.

Furthermore, in the image processing device as the embodiment, the filter coefficient is obtained by the derivation formula in which the plurality of blur characteristics is collectively incorporated in one set.

By solving the derivation formula in which the plurality of blur characteristics is incorporated as described above, the correction filter coefficient for each of the blur characteristics can converge not only to have a tendency that the blur itself is canceled out (that is, a tendency that an enhancement in a direction in which the blur is large is increased) as before, but also to have a tendency that the enhancement in the direction in which the blur is large is decreased and an enhancement in a direction in which the blur is small is increased.

As a result, it becomes possible to perform enhancement in the direction in which the blur is small mutually for each blur characteristic image and to correct the synthetic blur by the sum of those corrections, and thus it is possible to improve the correction performance for the synthetic blur.

Furthermore, in the image processing device as the embodiment, the derivation formula includes the formula for obtaining, for each of the blur characteristics, the difference between the sum total of the values obtained by performing the blur addition processing based on the blur characteristics and the blur correction processing based on the filter coefficient on the pixel value of the target image, and the predetermined ideal value.

The derivation formula including the formula is a derivation formula from which the filter coefficient for the blur correction corresponding to each of the plurality of blur characteristics is derived and in which the plurality of blur characteristics is collectively incorporated in one set.

Thus, the blur correction performance can be improved by using the filter coefficient derived from such a derivation formula for the blur correction.

Furthermore, in the image processing device as the embodiment, the correction unit acquires the combination information representing the combination of the blur characteristics, and acquires the filter coefficient corresponding to the combination of the blur characteristics represented by the combination information acquired, on the basis of the table (LUT 10) in which the filter coefficient for each of the blur characteristics is stored for each combination of the blur characteristics.

As a result, it becomes unnecessary to obtain the filter coefficient by using the derivation formula when acquiring the filter coefficient corresponding to the combination of the blur characteristics when correcting the synthetic blur in which the plurality of blur characteristics is synthesized.

Thus, it is possible to reduce the processing load of the image processing device for the blur correction.

Furthermore, in the image processing device (the image processing device 1A or 1B) as the embodiment, the correction unit (the coefficient acquisition unit 6A or 6B, and the blur correction unit 7 or 7A) includes the coefficient derivation unit (the coefficient derivation unit 13 or 13A) that derives the filter coefficient for each of the blur characteristics.

As a result, it is enabled to acquire an appropriate filter coefficient corresponding to the characteristic of the blur that occurs in an actual use environment and use the filter coefficient for the blur correction.

Thus, the blur correction can be performed more accurately by the filter coefficient corresponding to the blur characteristic that actually occurs, and the blur correction performance can be further improved. That is, the image quality can be further improved.

Moreover, in the image processing device as the embodiment, the correction unit acquires the combination information of the blur characteristics on the basis of the captured image by the imaging device (the imaging device 3).

As a result, it is enabled to acquire an appropriate filter coefficient corresponding to the synthetic blur that occurs in the actual use environment.

Thus, the blur correction performance can be improved and the image quality can be improved.

Furthermore, in the image processing device as the embodiment, the correction unit acquires the combination information of the blur characteristics on the basis of the operation input.

As a result, it becomes unnecessary to perform blur measurement using the imaging device when acquiring the filter coefficient for each of the blur characteristics.

Thus, it is possible to achieve simplification of the configuration and reduction of the cost for performing the blur correction.

Furthermore, in the image processing device (the image processing device 1 or 1A) as the embodiment, the filter coefficient for each of the blur characteristics is the filter coefficient for each image projection device, the image output unit distributes and outputs the plurality of blur-corrected images to the plurality of image projection devices.

As a result, it is enabled to appropriately correct the synthetic blur that occurs in a case where the superimposed projection is performed by the plurality of image projection devices.

Thus, it is possible to improve the image quality during the superimposed projection.

Moreover, in the image processing device (the image processing device 1B) as the embodiment, the filter coefficient for each of the blur characteristics is the filter coefficient for each of the images of the respective colors in the color image projection device, and the image output unit distributes and outputs the plurality of blur-corrected images to the spatial light modulators (the liquid crystal panels 16) of the respective colors in the color image projection device.

As a result, it is enabled to appropriately perform the blur correction corresponding to the case where the blur characteristics are different from each other between the projection images of the respective colors such as R, G, and B.

Thus, it is possible to improve the image quality during color image projection.

Furthermore, in the image processing device as the embodiment, the correction unit acquires the combination information of the blur characteristics on the basis of the captured image by the imaging device, and in the case where there are more types of the actually measured blur characteristics than types of the blur characteristics included in the table regarding the actually measured blur characteristic that is the blur characteristic measured on the basis of the captured image, reduces the types of the actually measured blur characteristics by unifying the blur characteristics that are in the approximation relationship among the actually measured blur characteristics.

As a result, it is enabled to appropriately acquire the filter coefficient for the blur correction in the case where there are more types of the actually measured blur characteristics than the types of the blur characteristics included in the table.

Thus, it is possible to correct the synthetic blur regardless of the number of types of the actually measured blur characteristics with respect to the types of the blur characteristics included in the table.

Furthermore, the image processing method as the embodiment includes: the correction step of obtaining the plurality of blur-corrected images by performing the blur correction processing on the input image regarding the focus blur that occurs in the projection image by the image projection device, by using the filter coefficient for the blur correction corresponding to each of the plurality of blur characteristics, the filter each being obtained on the basis of the plurality of blur characteristics; and the image output step of individually outputting the plurality of blur-corrected images obtained by the correction step.

With such an image processing method as the embodiment, it is also possible to obtain a function and an effect similar to those of the image processing device as the embodiment described above.

Note that, the advantageous effects described in the specification are merely examples, and the advantageous effects of the present technology are not limited to them and may include other effects.

6. Present Technology

Note that, the present technology can also be configured as described below.

(1)

Image processing device including:

a correction unit that obtains a plurality of blur-corrected images by performing blur correction processing on an input image regarding a focus blur that occurs in a projection image by an image projection device, by using a filter coefficient for blur correction corresponding to each of a plurality of blur characteristics, the filter each being obtained on the basis of the plurality of blur characteristics; and an image output unit that individually outputs the plurality of blur-corrected images obtained by the correction unit.

(2)

The image processing device according to (1), in which the filter coefficient is obtained by a derivation formula in which the plurality of blur characteristics is collectively incorporated in one set.

(3)

The image processing device according to (2), in which the derivation formula includes a formula that obtains, for each of the blur characteristics, a difference between a sum total of values obtained by performing blur addition processing based on the blur characteristics and the blur correction processing based on the filter coefficient on a pixel value of a target image, and a predetermined ideal value.

(4)

The image processing device according to any of (1) to (3), in which the correction unit acquires combination information representing a combination of the blur characteristics, and acquires the filter coefficient corresponding to the combination of the blur characteristics represented by the combination information acquired, on the basis of a table in which the filter coefficient for each of the blur characteristics is stored for each combination of the blur characteristics.

(5)

The image processing device according to any of (1) to (3), in which the correction unit includes a coefficient derivation unit that derives the filter coefficient for each of the blur characteristics.

(6)

The image processing device according to any of (1) to (5), in which the correction unit acquires combination information of the blur characteristics on the basis of a captured image by an imaging device.

(7)

The image processing device according to any of (1) to (5), in which the correction unit acquires combination information of the blur characteristics on the basis of an operation input.

(8)

The image processing device according to any of (1) to (7), in which the filter coefficient for each of the blur characteristics is a filter coefficient for each image projection device, and the image output unit distributes and outputs the plurality of blur-corrected images to a plurality of the image projection devices.

(9)

The image processing device according to any of (1) to (7), in which the filter coefficient for each of the blur characteristics is a filter coefficient for each of images of respective colors in a color image projection device, and the image output unit distributes and outputs the plurality of blur-corrected images to spatial light modulators of the respective colors in the color image projection device.

(10)

The image processing device according to (4), in which the correction unit acquires combination information of the blur characteristics on the basis of a captured image by an imaging device, and in a case where there are more types of actually measured blur characteristics than types of the blur characteristics included in the table regarding the actually measured blur characteristic that is the blur characteristic measured on the basis of the captured image, reduces the types of the actually measured blur characteristics by unifying the blur characteristics that are in an approximation relationship among the actually measured blur characteristics.

REFERENCE SIGNS LIST 1, 1A, 1B Image processing device
2 Projector device
3 Imaging device
5 Image input unit
6, 6A, 6B Coefficient acquisition unit
7, 7A Blur correction unit
7a Blur correction filter
8, 8A Image output unit
10 Look-up table (LUT)
11 Blur measurement unit
12, 12A, 12B Control unit
13, 13A Coefficient derivation unit
14 Color image generation unit
15 Optical system
16 (16R, 16G, 16B) Liquid crystal panel
17 Color synthesis prism
18 Projection lens (projection optical system)
S Screen
Pp Superimposed projection image

The invention claimed is:

1. An image processing device, comprising:
a correction unit configured to obtain a plurality of blur-corrected images by a blur correction processing operation on an input image regarding a focus blur that occurs in a projection image projected by an image projection device, by using a filter coefficient for blur correction corresponding to each of a plurality of blur characteristics, wherein
the filter coefficient is obtained based on the plurality of blur characteristics, and
the filter coefficient is obtained by a derivation formula in which the plurality of blur characteristics is collectively incorporated in one set; and
an image output unit configured to individually output the plurality of blur-corrected images obtained by the correction unit.

2. The image processing device according to claim 1, wherein the derivation formula includes a formula that obtains, for each of the plurality of blur characteristics, a difference between a sum total of values obtained by addition processing performed based on the plurality of blur characteristics and the blur correction processing operation based on the filter coefficient on a pixel value of a target image, and a predetermined ideal value.

3. The image processing device according to claim 1, wherein the correction unit is further configured to:
acquire combination information representing a combination of the plurality of blur characteristics, and
acquire the filter coefficient corresponding to the combination of the plurality of blur characteristics represented by the combination information acquired, based on a table in which the filter coefficient for each of the plurality of blur characteristics is stored for each combination of the plurality of blur characteristics.

4. The image processing device according to claim 1, wherein
the correction unit includes a coefficient derivation unit, and
the coefficient derivation unit is configured to derive the filter coefficient for each of the plurality of blur characteristics.

5. The image processing device according to claim 1, wherein the correction unit is further configured to acquire combination information of the plurality of blur characteristics based on a captured image by an imaging device.

6. The image processing device according to claim 1, wherein the correction unit is further configured to acquire combination information of the plurality of blur characteristics based on an operation input by a user.

7. The image processing device according to claim 1, wherein
the filter coefficient for each of the plurality of blur characteristics is a filter coefficient for each image projection device a plurality of the image projection devices, and
the image output unit is further configured to distribute and output the plurality of blur-corrected images to the plurality of image projection devices.

8. The image processing device according to claim 1, wherein
the filter coefficient for each of the plurality of blur characteristics is a filter coefficient for each of a plurality of images of respective colors in a color image projection device, and
the image output unit is further configured to distribute and output the plurality of blur-corrected images to spatial light modulators of the respective colors in the color image projection device.

9. The image processing device according to claim 3, wherein the correction unit is further configured to:
acquire the combination information of the plurality of blur characteristics based on a captured image by an imaging device, and
reduce, in a case where there are more types of actually measured blur characteristics than types of the plurality of blur characteristics included in the table regarding the actually measured blur characteristic that is the blur characteristic measured based on the captured image, the types of the actually measured blur characteristics by unifying the plurality of blur characteristics that are in an approximation relationship among the actually measured blur characteristics.

10. An image processing method, comprising:
obtaining a plurality of blur-corrected images by a blur correction processing operation on an input image regarding a focus blur that occurs in a projection image projected by an image projection device, by using a filter coefficient for blur correction corresponding to each of a plurality of blur characteristics, wherein
the filter coefficient is obtained based on the plurality of blur characteristics,
the filter coefficient is obtained by a derivation formula in which the plurality of blur characteristics is collectively incorporated in one set; and
individually outputting the plurality of blur-corrected images.

11. An image processing device, comprising:
a correction unit configured to obtain a plurality of blur-corrected images by a blur correction processing operation on an input image regarding a focus blur that occurs in a projection image projected by an image projection device, by using a filter coefficient for blur correction corresponding to each of a plurality of blur characteristics, wherein
the filter coefficient is obtained based on the plurality of blur characteristics, and
the filter coefficient for each of the plurality of blur characteristics is a filter coefficient for each of a plurality of images of respective colors in a color image projection device; and
an image output unit configured to distribute and output the plurality of blur-corrected images to spatial light modulators of the respective colors in the color image projection device.

* * * * *